(12) United States Patent
Schip

(10) Patent No.: US 9,027,623 B2
(45) Date of Patent: May 12, 2015

(54) WELDING APPARATUS FOR CONVEYOR BELTS AND METHOD

(75) Inventor: Joannes Stefanus van 't Schip, Ionia, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 397 days.

(21) Appl. No.: 12/888,411

(22) Filed: Sep. 22, 2010

(65) Prior Publication Data

US 2011/0067801 A1    Mar. 24, 2011

Related U.S. Application Data

(60) Provisional application No. 61/244,872, filed on Sep. 22, 2009.

(51) Int. Cl.
| | |
|---|---|
| *B29C 65/02* | (2006.01) |
| *B29C 65/14* | (2006.01) |
| *B29C 65/00* | (2006.01) |
| *B29C 65/78* | (2006.01) |
| *F16G 3/00* | (2006.01) |

(Continued)

(52) U.S. Cl.
CPC ......... *B29C 66/4324* (2013.01); *B29C 65/1412* (2013.01); *B29C 65/1432* (2013.01); *B29C 65/782* (2013.01); *B29C 65/7844* (2013.01); *B29C 66/1142* (2013.01); *F16G 3/003* (2013.01); *F16G 3/10* (2013.01); *F16G 3/16* (2013.01); *B29C 66/4322* (2013.01); *B29C 66/49* (2013.01); *B29C 66/5241* (2013.01)

(58) Field of Classification Search
CPC .......................... B29C 65/782; B29C 66/4324

USPC ............................................... 156/304.6, 507
See application file for complete search history.

(56) References Cited

U.S. PATENT DOCUMENTS 4,173,509 A * 11/1979 Raabe et al. .................. 156/507
4,557,027 A * 12/1985 Fisher et al. .................. 29/33.2

(Continued)

FOREIGN PATENT DOCUMENTS

| | | |
|---|---|---|
| EP | 0 928 678 A2 | 7/1999 |
| EP | 1 005 970 A2 | 6/2000 |

(Continued)

OTHER PUBLICATIONS

Tools Catalogue Issued by Volta Belting Technology Ltd., Dec. 2008 (12 pages).

(Continued)

*Primary Examiner* — Mark A Osele
(74) *Attorney, Agent, or Firm* — Fitch, Even, Tabin & Flannery LLP

(57) ABSTRACT

A belt welding apparatus is provided for joining together the ends of one or more monolithic conveyor belts. In one form, a belt support is configured to support the belt ends in spaced relation to each other and a non-contact heating device is provided for being disposed between the belt ends to generate thermal radiation for joining the belt ends together. In another form, a drive mechanism is operable to cause relative movement of a pair of platens, for supporting belt ends, toward and away from each other and a heating device between heating and stowed positions. An actuator of the drive mechanism is movable by an operator between at least three operation positions corresponding to three different operation positions of the platens.

12 Claims, 13 Drawing Sheets

(51) Int. Cl.
*F16G 3/10* (2006.01)
*F16G 3/16* (2006.01)

(56) References Cited

U.S. PATENT DOCUMENTS

| | | | | |
|---|---|---|---|---|
| 4,781,787 | A | * | 11/1988 | Weissfloch et al. ............ 156/507 |
| 4,863,552 | A | | 9/1989 | Ishida et al. |
| 4,886,680 | A | * | 12/1989 | Tindall ................................ 427/8 |
| 4,968,369 | A | | 11/1990 | Darcy et al. |
| 5,234,473 | A | | 8/1993 | Piper et al. |
| 5,241,157 | A | * | 8/1993 | Wermelinger et al. ........ 219/243 |
| 5,329,094 | A | * | 7/1994 | Murphy et al. ................ 219/243 |
| 5,552,005 | A | | 9/1996 | Mammino et al. |
| 5,630,500 | A | | 5/1997 | Conrad |
| 5,712,705 | A | * | 1/1998 | Fattinger et al. .............. 356/521 |
| 5,865,918 | A | | 2/1999 | Franklin et al. |
| 6,468,656 | B1 | | 10/2002 | Beha |
| 6,849,836 | B2 | | 2/2005 | Yu |
| 6,947,665 | B2 | | 9/2005 | Garmer et al. |
| 6,991,693 | B2 | | 1/2006 | Wylie et al. |
| 7,229,264 | B2 | | 6/2007 | Crooks |
| 7,358,026 | B2 | | 4/2008 | Dudek et al. |
| 7,730,921 | B2 | | 6/2010 | Acors |
| 2001/0039126 | A1 | * | 11/2001 | Ebinuma et al. .............. 438/795 |
| 2007/0044897 | A1 | * | 3/2007 | Hoffmann et al. ............ 156/157 |
| 2009/0078367 | A1 | | 3/2009 | Beute et al. |
| 2009/0133824 | A1 | | 5/2009 | Acors |

FOREIGN PATENT DOCUMENTS

| | | |
|---|---|---|
| EP | 1 367 450 A2 | 5/2003 |
| JP | S57-144741 A | 9/1982 |
| JP | H08-113400 A | 5/1996 |
| JP | 2008-221630 A | 9/2008 |

OTHER PUBLICATIONS

Brochure for "ThermoDrive Splicing System" issued by Mol Industries, Inc., unknown publication date (2 pages).
Notification of Transmittal of the International Search Report and the Written Opinion of the International Searching Authority, or the Declaration from the International Bureau of WIPO for International Application No. PCT/US2010/049895 dated Feb. 10, 2011, 16 pages.
Notification of Transmittal of the International Search Report and the Written Opinion of the International Searching Authority, or the Declaration from the International Bureau of WIPO for International Application No. PCT/US2010/002599 dated May 1, 2012, 13 pages.
Notification concerning Transmittal of International Preliminary Report on Patentability (Chapter I of the Patent Cooperation Treaty) from the International Bureau of WIPO for International Application No. PCT/US2010/002599 dated May 31, 2012, 11 pages.
Intralox ThermoDrive® Belt Splicing System v.2.0 Instruction Manual issued by Intralox L.L.C., 2009, 43 pages.

* cited by examiner

WELDING APPARATUS FOR CONVEYOR BELTS AND METHOD

CROSS REFERENCES TO RELATED APPLICATIONS

This patent claims benefit under 35 U.S.C. §119 (e) to U.S. Provisional Application No. 61/244,872 entitled "Infrared Vulcanizing Tool for Monolithic Belts" filed Sep. 22, 2009, the contents of which are incorporated herein by reference in its entirety.

FIELD OF THE INVENTION

The invention relates to an apparatus for joining together ends of one or more conveyor belts and, more particularly, to a welding apparatus for forming a weld between the ends of one or more monolithic conveyor belts.

BACKGROUND OF THE INVENTION

Several industries utilize conveyor and process belts for transporting loads from one location to another location or for passing loads through successive processing operations. Many of these applications require conveyor belts that are able to maintain cleanliness under various and sometimes harsh conditions. For example, in the food and dairy industries, conveyor belts should provide sanitary surfaces for conveying food and dairy products to minimize the potential for contaminating these products. To meet this need, conveyor belt surfaces are often formed of materials, for example thermoplastic materials, that do not become easily contaminated when contacted with food or dairy products on the conveyor belt surface.

Monolithic conveyor belts are often used in applications that require light to medium duty conveyor belts. Unlike traditional conveyor belts that include layers or plies of fabric carcasses embedded between thermoplastic or rubber layers, monolithic conveyor belts are typically formed from a single homogenous material, for example a thermoplastic material, although they may include other composite materials such as reinforcing fibers. Forming the belt from a single thermoplastic material is often desirable because the thermoplastic material is less prone to providing sites for microbiological growth due to contamination from, for example, contact with conveyed food or dairy products. However, because these monolithic conveyor belts do not include a fabric carcass to increase the tensile strength of the belt, it is particularly important to ensure that these belts possess a generally uniform cross sectional thickness, and do not have areas of weakness where tear propagation can occur, potentially leading to ultimate failure of the belt.

In addition, monolithic conveyor belts used in these applications can often take the form of positive drive belts. Like monolithic belts generally, as described previously, monolithic positive drive belts are formed of a homogeneous thermoplastic material, with or without the addition of reinforcing materials. However, these belts additionally include projections that are configured to interengage with structures on a drive roller to positively drive the projections to drive the conveyor belt. In one example, these belts include a series of equally longitudinally spaced, laterally extending drive projections or fins that extend generally orthogonally from the non-conveying surface of the belt. Unlike ordinary conveyor belts, which typically rely on friction between the belt and drive rollers in the conveyor system to provide the driving force to move the conveyor belt, positive drive belts utilize force generated on a driving side of the ribs, in addition to frictional forces, to generate the driving force to drive the belt. To this end, a conveyor system utilizing monolithic positive drive belts will typically include one or more driven rotatable sprockets that interengage with the ribs, so that upon rotation of the sprockets, the sprocket teeth will engage the driving side of the ribs to generate the driving force in the conveying direction of the conveyor belt system. Similarly, the positive drive belt may include cogs that are positively driven by a drive roller. Thus, monolithic positive drive belts typically have a uniform pitch, which is the longitudinal distance between the projections, e.g. the crests of the ribs along the belt, which corresponds to a uniform circular pitch of the sprocket being used to drive the belt.

During installation and repair of monolithic belts, including both standard and positive drive belts, it is often necessary to join together the ends of one or more monolithic conveyor belts. While several methods exist for joining together the belt ends, including utilizing adhesives or mechanical fasteners to join the ends, one preferred method is to form a butt weld between the belt ends. To this end, the belt ends are typically prepared by squaring the belt ends so that they extend orthogonally to the belt edges, although they may be formed at corresponding angles to one another. The prepared belt ends are heated to soften or melt the material at the belt ends. With the material in the belt ends remaining softened, the belt ends are subsequently urged together into end-to-end abutment so that the material of the two belt ends becomes intermixed. Upon subsequent cooling of the belt ends, the softened material of the two belt ends will harden and fuse to join the belt ends together.

Previous conveyor belt welders have generally included a pair of longitudinally extending belt positioning platens positioned side-by-side, with at least one of the platens translatable toward and away from the other platen. In this regard, it should be noted that this welder extends lengthwise across the lateral or transverse width of the belt so that the transverse center of the tool is generally disposed at the longitudinal ends of the belt or belts to be joined together.

The top surfaces of the platens are generally coplanar, and the belt ends are positioned on the platens, and held in place, so that upon lateral movement of one of the platens toward the other of the platens, the belt ends will engage to facilitate intermixing of the material of the belt ends. In the previous welders, a lever is connected to a shaft and configured so that rotation of the lever and the shaft generates transverse movement of one of the platens. A rack and pinion gear is used to translate the rotation of the shaft into transverse movement of the movable platen toward and away from the stationary platen.

In the prior welding apparatus, a contact heating element is positioned between the belt ends during heating, and the belt ends are moved into engagement with the contact heating element to melt the belt ends. The heating element includes an elongate contact heating bar or wand that has a pair of heated surfaces, on each side of an elongate bar with a generally rectangular cross section. A resistance heating element runs through the heating bar to heat the bar to a welding temperature. The heating bar is formed of a heat conducting material, for example a metal material, to conduct heat from the resistance heating element, to the outer heated surfaces of the heating bar. The heated surfaces face the belt ends to be welded together which are shifted to engage the heated surfaces for melting the belt material at the belt edges. Due to considerable material loss due to sticking of the belt material to the heated surfaces of the heating element, a non-stick material, for example Teflon, is coated on the heated surfaces to reduce the amount of material that sticks to the heating bar during contact heating of the belt ends.

In the prior welder, a handle is disposed at the top of the heating bar, to provide a location for a user to grasp and lift the heated bar from above in order to insert and remove the heated bar from its welding position between the belt ends. The handle is typically formed with a heat insulating cover to help protect operators from injuring themselves on the heated bar. The prior belt welder provides a space between the platens, between which the heated bar may be manually inserted and removed from above during welding.

Prior to use, the belt ends are typically prepared by cutting to form belt edges that are substantially perpendicular to the belt longitudinal or lengthwise direction. Next the belt ends are loaded on the platens. To this end, the user can rotate the handle, which causes the shaft to rotate, so that the pinion urges the rack laterally to move one of the platens toward and away from the other platen. To position the belt ends in a starting position, the user rotates the lever clockwise to space the platens apart. The user next places a separate spacer between the platens and rotates the lever in the opposite counter-clockwise direction to move the platen back toward the other platen to squeeze the platens against the spacer. The belt ends are next positioned on the platen upper surfaces. If the welder is being used to join positive drive belts ends, separate adapters must be utilized to key the ribs. The belt ends are clamped into position on the platen upper surfaces, with the belt ends positioned in end-to-end abutment, and the spacer is removed.

With the belt ends mounted, the user may next heat the belt ends by first rotating the lever clockwise to slide the movable platen away from the opposite platen, providing a space between the two belt ends. With the belt ends separated, the user must grasp the upper handle of the previously preheated heating bar, and manually lower the heating bar into the space between the belt ends. With the heating bar between the belt ends, the lever is rotated in the opposite counter-clockwise direction in order to move the movable platen back toward the opposite platen so that each belt end abuts a corresponding one of the heated surfaces of the heating bar to squeeze the heating bar between the belt ends. In the prior welder, the user visually determines the proper extent that the belt ends are moved against the heating bar and the amount of time that the belt edges are pressed against the heating bar by subjectively determining whether a sufficient mushroom shape of melted material has been extruded from between the belt ends and the heating bar. Thus, the user must determine, typically based on experience, the amount of time to leave the belt ends in engagement with the heated bar. The amount of time will generally depend on the characteristics of the belt, including its cross sectional size and the material from which it is made, as well as the temperature of the heated bar. It should be noted that the material that is extruded from the belt ends during heating is not used to join the belt ends and must be removed. This can lead to inconsistent results welds because the extent of the mushroom of Material is subjectively determined by the operator. This is particularly problematic in positive drive belts, because with varying amounts of extruded material, either the pitch will change between the adjacent ribs during joining of the belt ends or the amount of belt material at the joint will vary, leading to thinner areas of the belt with insufficient belt material and areas of weakness.

After the user has determined that the ends of the belt are sufficiently softened to form a weld therebetween, i.e. a sufficient mushroom of belt material has formed at the interface with the heating bar, the user must again rotate the handle in the clockwise direction to move the movable platen away from the stationary platen to provide clearance for removing the heated bar. With the belt ends separated the user again grasps the upper handle of the heating bar and lifts it from between the belts. While the belt ends are still softened, the user next rotates the handle back in the counter-clockwise direction so that the rack and pinion urge the movable platen toward the stationary platen to clash the belt ends against one another to overlap their softened material. In these systems, because it is important to quickly join the belt ends after they have been heated, the time required for the operator to remove the heating device has been found to reduce the quality of the resulting welds because the belt ends are given time to cool.

After the heating device is removed, the handle is rotated beyond the position at which the belts were loaded so that the belt ends overlap past their original position of end-to-end abutment and the softened material of the belts can intermix. In this regard, a portion of the melted material will be extruded from between the belt ends, forming a mushroom of material about the joint area. The extent that an operator moves the handle past the original end-to-end abutment with the prior welder is determined by the amount of material that extrudes out from between the belts, a subjective standard that does not provide consistent belt overlap distances from welding operation to welding operation, reducing the repeatability and quality of belt splices. It should be understood that at this point, the longitudinal lengths of the belt ends will be effectively decreased by a combined amount equal to the distance that the belt ends are overlapped beyond their original end-to-end abutment position. The belts are held in this position until the material between the belt ends is sufficiently cooled, to reharden, fusing the material of the two belt ends together and forming a joint between the two belt ends.

A high quality weld results in a joint between the belt ends that closely resembles the original belt in both material strength and size while also providing a continuous conveying surface. In contrast, poorly formed welds can result in bubbles forming in the material at the welding site due to overheating, potentially resulting in discontinuities in the belt surface providing locations for microbiological growth when contaminated and also areas of weakness where tear propagation and ultimate failure of the belt can occur. Poor welds can form for several reasons. For example, if the belt is heated at too high a temperature or for too long, the material at the very edge of the belt can become burned or overheated, changing the chemical composition of the material and potentially forming an area of weakness and discoloration of the belt and porous bubbles to form. If the belt ends are heated at too low of a temperature or for too short a period of time, the belt ends may not be sufficiently melted to intermix with the material of the opposite belt end to sufficiently fuse together to form a joint between the belts upon subsequent cooling.

Several problems have been found to exist with the prior welding tool that decrease the quality of welds produced with these tools. First, it has been found that during heating, with the belt ends contacting the resistive heating device, despite the non-stick coating on the heating bar, at least a portion of the heated material sticks to the heating element when the belts are removed. In addition, upon inserting and removing the heating element within the space between the belt ends, the operator often unintentionally contacts a portion of the heating element against a portion of the belt end, causing further material loss and non-uniform heating to the belt ends. Material sticking to the heating device is inconvenient to users and requires regular manual cleaning of the heating device between each welding operation. Material loss is also problematic, particularly if the welding tool is used to weld together ends of a positive drive belt. In this regard, it is difficult to maintain the pitch between ribs adjacent to the weld site, because an unknown quantity of the belt material is removed from the belt ends. Because the amount of overlap of the belt ends is determined by visually examining the extruded belt material between the belt ends as they are engaged, the extent to which the belts overlap to generate this material extrusion will vary with the amount of material lost during belt heating, decreasing the user's ability to obtain repeatable belt welding results and maintain the proper pitch between ribs of the belt. Because positive drive belts and the sprockets that drive them have precise corresponding pitches, altering the pitch between two ribs where the belt ends are joined together can interfere with proper functioning of the positive drive system. It has also been found that the edges of the belt ends contacting the heating element can become damaged or scorched during heating, degrading the quality of the final weld as described previously.

The prior welder can also lead to uneven belt heating and non-uniform belt joining results. More specifically, uneven heating can be caused if the heating element does not have a consistent temperature along the entire width of the conveyor belt ends so that hot and cool portions are formed with some material being subjected to more heat along the width of the conveyor belt. This can result in portions of the belt width becoming overheated or underheated, which may result in a deficient weld as described previously. In addition, it has been found that the prior welder leads to unrepeatable results due to the heating depth along the belt varying upon the user engaging the belt ends against the heating element. Specifically, determining that a proper mushroom shape of extruded material has formed between the belt ends and the heater to assess adequate heating is an imprecise measure and may vary from operator to operator and from weld to weld.

In the same manner, the extent that the user overlaps or clashes the belt ends together has been found to vary. During the belt joining stage, the user clashes the belt together until a proper "bead" of material forms at the interface between the belt ends at upper and lower surfaces thereof. However, determining the proper clash based on a bead of material forming is very subjective and makes it difficult for operators to generate repeatable results with consistent pitches of the resulting belt. In addition, the welding operation requires precision, with an amount of material clash on the order of one millimeter, so that it is difficult for an operator to provide the precise amount of rotation of the handle without moving the handle too much or too little, which can create a weaker weld because the material being clashed with the opposite belt end may be further from the edges of the belts, which may not be full melted, so that the resulting weld may be weak. Creating the wrong amount of overlap between the belt ends not only forms a weak weld between the belt ends but can also lead to an incorrect pitch between the ribs on a positive drive belt, decreasing its ability to properly operate in a positive drive system.

At the same time, the prior welder can be relatively unsafe and inconvenient because it requires the operator to rotate the handle with one hand while manually inserting and removing an extremely hot heating bar between the belt ends and an additional spacer. The operator must therefore go through a number of discrete steps and maintain the heating element outside of the tool for a substantial portion of the welding operation. In addition, the resistance heating elements used in this tool must be preheated for a relatively long period of time prior to reaching a desired weld temperature, and similarly must be cooled for a relatively long period of time, so that the cycle time for creating a weld can be long.

SUMMARY OF THE INVENTION

The present belt welding apparatus for joining two ends of one or more monolithic conveyor belts provides consistent heating and joining of the ends of one or more conveyor belts. Herein, it will be understood the term belt ends contemplates portions of a belt or belts at the ends thereof. Further, the term monolithic conveyor belt includes conveyor belts having additional composite materials. In accordance with one aspect, the present belt welding apparatus includes a belt support for supporting the belt ends in spaced relation to each other and a non-contact heating device for being disposed between and spaced from the belt ends for generating thermal radiation to provide to the belt ends so that the belt ends can be welded together. In this regard, the non-contact heating device generates thermal radiation sufficient to melt the material of the belt ends without contacting the belt ends so that belt material does not stick to the heating device and the heating device does not have to be cleaned between welding operations. Similarly, the use of a non-contact heater also reduces material loss from the belt ends due to sticking. In this manner a uniform pitch between drive projections in a positive drive belt may be maintained without reducing the amount of material or thickness of the conveyor belt at the weld location so that a strong resulting weld may be formed. It has been found that using a non-contact heating device provides thermal radiation to more uniformly heat the belt ends without scorching or damaging the belt material than engaging the belt ends against a heating device until a sufficient mushroom of material is extruded therefrom. It should be understood that the term melt, as used herein, generally refers to heating the belt material to sufficiently soften the belt material for joining the belt ends together. Melting of the belt material does not necessarily mean that the belt material becomes molten so that it drips from the belt ends, but includes belt material that retains viscosity and does not drip.

In one form, the non-contact heating device includes an infrared heating device that is disposed between the two ends of one or more monolithic conveyor belts and spaced therefrom. The infrared heating device is capable of rapidly heating to avoid the need for an operator to wait for a resistance heating bar to preheat prior to heating the belt ends, reducing the cycle time of the welding apparatus.

The belt support may include a pair of platens wherein one of the platens has a movable mount. The non-contact heating device also has a movable mount, and an actuator is operable to simultaneously shift the movable mount for the one platen in a belt shifting direction and the movable mount of the non-contact heating device in a heating device shifting direction that is transverse to the belt shifting direction. In one form, the belt shifting direction is orthogonal to the heating device direction. In this manner, an operator can conveniently shift the platens, and the belt ends supported thereon, and the heating device with an actuator and avoid the need for utilizing a separate heating bar that must either be held or placed to the side during welding, as was required with previous belt welding devices.

In one form, the actuator is coupled to both the belt support and the non-contact heating device and is operable to shift the belt support and non-contact heating device between a belt loading position, a belt end melting position, and a belt end joining position, providing convenience to the operator. In this regard, the belt support is configured to support the belt ends closely adjacent to or engaging each other and the non-contact heating device is configured to be disposed in a stowed location in the belt loading positions thereof. In this position, the operator can easily load the belt ends onto the platens without interference by the heating device. When the actuator is operated to shift the belt support and the non-contact heating device to the belt end melting position, the belt support is configured to support the belt ends to be spaced from each other and the non-contact heating device is configured to be disposed between the belt ends. Thus, the belt ends are separated to provide clearance for the heating device and the heating device is moved between the belt ends to melt the material thereof by use of the actuator to avoid the operator having to separately move the belt ends apart and manually insert a heating device. The actuator provides convenience to the operator and reduces the occurrence of inadvertent contact of the heating device and the belt ends, which could otherwise lead to uneven heating of the belt ends and material loss. With the belt support and the non-contact heating device shifted to the belt joining position by operation of the actuator, the belt support is configured to support the belt ends to engage each other and the non-contact heating device is configured to be disposed in a stowed location. In this manner, the non-contact heating device is removed so that the belt ends can be joined together without requiring the operator to remove the heating device manually, avoiding inadvertent contact with the belt ends. In addition, the operator is not required to separate the belt ends and manually remove a heating bar, which requires additional time and could otherwise give the belt ends time to cool and reduce the quality of the resulting weld.

In one form, the belt support includes a pair of platens with structures for receiving drive projections of the belt ends: A template configured for forming a cut belt ends is provided so that when the drive projections are received by the platen structures, there is a predetermined spacing between each of the belt ends and the non-contact heating device disposed therebetween. In this regard, the distance between the belt ends and the non-contact heating device is consistent so that the belt ends are properly heated without requiring a subjective visual identification of belt heating by the operator. In addition, extruded belt material is not formed during belt heating as with previous welders, which would otherwise reduce the material for forming the weld, so that consistent welds are formed.

According to another aspect, the welding apparatus includes a drive mechanism that is operable to move a pair of belt supporting platens relative to each other to move the belt ends toward and away from each other and to move a heating device between a heating position, with the heating device disposed between the belt ends and a stowed position. An actuator is coupled to the drive mechanism and can be moved by the operator between at least three operation positions that correspond to different operation positions of the pair of platens. With the actuator in a belt loading operation position, the platens are spaced from each other by a predetermined loading distance and the heating device is in a stowed position. In this regard, the operator can load conveyor belt ends on the platens without interference from the heating device and without having to separately manually hold a heating bar or set it off to the side. In a belt heating operation position of the actuator, the heating device is in the heating position and the platens are spaced by a predetermined heating distance from the heating device. With the actuator in a belt joining operation position, the heating device is in the stowed position and the platens are spaced closer together than the predetermined loading distance so that the melted belt ends supported on the platens engage each other and are allowed to solidify to join the belt ends together. The actuator also allows the operator to sequentially move the belt ends supported by the platens and the heating device into their respective positions corresponding to each of the operation positions using a single actuator. Providing an actuator for positioning the heating device between the belt ends or in a stowed position provides operator convenience, because the operator is not required to manually insert and remove a heating device between the belt ends. Further, the heating device may be removed without inadvertent contact with the belt ends so that the proper amount of belt overlap may be created during belt joining without creating an area of weakness at the weld location due to insufficient material. In addition, the actuator provides appropriate spacing of the belt ends relative to the heating device so that the belt ends are properly heated for each weld cycle and provide consistent results. In this approach, preferably one platen is fixed and the other platen is movable toward and away from the fixed platen, although both platens may be movable.

The actuator may include a rotatable lever that is rotatable along a predetermined arcuate pathway. The actuator belt loading operation position is an intermediate position of the lever along the pathway. The belt heating operation position and the belt joining operation position are on either side of the intermediate position. In this regard, for a complete joining cycle, the lever is only shifted in opposite rotary directions or more particularly, the lever is rotated once in a first rotary direction from the intermediate position to the belt heating operation position and once in a second rotary direction opposite to the first rotary direction from the belt heating operation position to the belt joining operation position. In this regard, with the actuator in the intermediate position, the operator can conveniently sequentially move both the heating device and the belt ends to different operation positions with only two rotational movements of the lever along the arcuate pathway.

In one form, the actuator is rotatable along a predetermined arcuate pathway and may include a preset intermediate position corresponding to the actuator belt loading operation position. The actuator belt heating operation position and the actuator belt joining operation position are at preset positions in different rotary directions along the pathway at predetermined angular distances from the preset intermediate position. In this regard, by moving the actuator between the preset positions along the arcuate pathway, the operator can move the heating device and the platens to their different operation positions in appropriate relation to each other consistently during each belt joining operation to provide proper heating and joining of the belt ends.

In one form, the welding apparatus includes a housing assembly, and the platens, the drive mechanism and the actuator are mounted to the housing. A detent mechanism is included between the housing assembly and the drive mechanism, and releasably retains the actuator in the intermediate position to define the intermediate position. Preferably, the drive mechanism includes stops to define preset positions of the actuator at the belt heating operation position and the belt joining operation position. The stops advantageously provide the operator with a positive indication of the belt heating operation position and the belt joining operation position of the actuator so that proper heating and joining of the belt ends can be consistently achieved.

The welding apparatus may be used with positive drive belts having drive projections projecting therefrom that are arranged so that adjacent drive projections having a predetermined pitch spacing therebetween. In this regard, the actuator belt joining operation position includes a preset position of the actuator with the platens spaced by a predetermined joining distance that is a predetermined distance less than the predetermined loading distance. In this regard, the belt ends are brought together to overlap each other by a predetermined amount that is equal to at least the predetermined distance so that the belt material can intermix and the endmost drive projections of the joined belt ends retain the predetermined pitch spacing thereof, while avoiding the operator having to subjectively determine the appropriate amount of belt overlap so that the pitch could vary, as with previous belt welding devices. A template may be configured to cut the belt ends so that with the drive projections received in the platen structures and the actuator in the belt loading operation position, the belt ends abut each other. With the actuator moved to the belt joining operation position, the overlap of the melted belt ends is equal to the predetermined distance. In this manner, the configurations of the template and plates are coordinated to provide a predetermined amount of material of the belt ends beyond the drive projections after a cut is made, so that the welding apparatus can obtain repeatable results and maintain proper pitch between adjacent drive projections of the belt.

In one form, the drive mechanism of the welding apparatus includes a cam mechanism that has a cam path that is shifted by operation of the actuator. Cam followers are connected to the heating device and one of the platens and mounted in the cam path so that actuator operation generates caroming action between the cam path and the cam followers for shifting the heating device and the platen connected thereto. The cam path can have a predetermined configuration programmed so that as the actuator is shifted between the belt loading position and the belt joining position, the heating device remains substantially stationary in the stowed position. In this regard, the cam mechanism advantageously generates programmed movement of both the platen and the heating device.

According to another aspect of the invention, a method for welding conveyor belt ends together is provides that includes supporting the belt ends in spaced relation from each other. The method also includes melting the material of the belt ends by operation of a heating device therebeween. Further the method includes providing a single actuator to sequentially shift the heating device and the belt ends by operating the single actuator to shift the heating device into the space between the belt ends, operating the single actuator to shift the heating device out from the space between the belt ends after the material of the belt ends is melted, and operating the single actuator to shift the belt ends toward each other to intermix the melted material. In this regard, an operator can operate the single actuator for a welding operation that joins the belt ends together. In this manner, an operator can conveniently join belt ends together using a single actuator and avoiding the need to manually insert and remove a heated bar from between the belt ends. In one form, the single actuator sequentially shifts the heating device and the belt ends by rotating the single actuator only once in opposite rotary directions, providing a consistent method for positioning the belt ends and the heating device.

According to another aspect of the invention, a heating device for melting belt ends is provided that includes a tubular thermal radiation transmissive housing with a heating filament extending therein. &thermal radiation reflective coating extends about and along the tubular housing. Uncoated opposite side portions allow thermal radiation to pass therethough toward belt ends adjacent to the uncoated portions, while the reflective coating restricts thermal radiation transfer therethough. In this manner, thermal radiation is directed toward the belt ends and not in undesired directions. In one form, the heating filament is closer to a bottom portion than to a top portion of a generally cylindrical chamber of the housing and the uncoated portions are closer to the bottom portion so that they are aligned with the heating filament. In this manner, the amount of heat direct toward the belt ends adjacent to the uncoated portions is maximized.

DETAILED DESCRIPTION OF THE PREFERRED EMBODIMENTS

Figure 1:
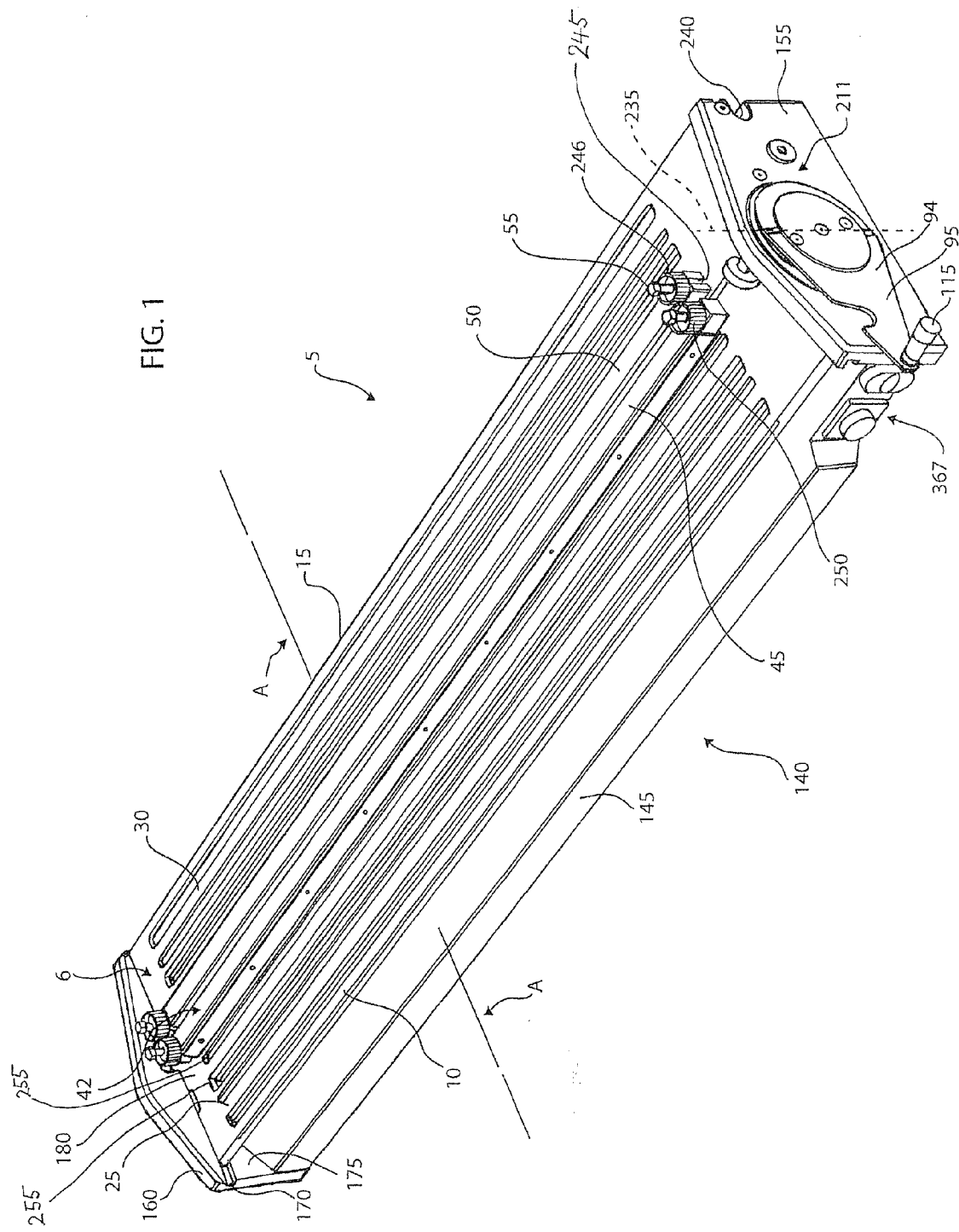
FIG. 1 is a perspective view of a belt welding apparatus in accordance with one aspect showing an actuator lever positioned in a belt joining operation position.
Figure 2:
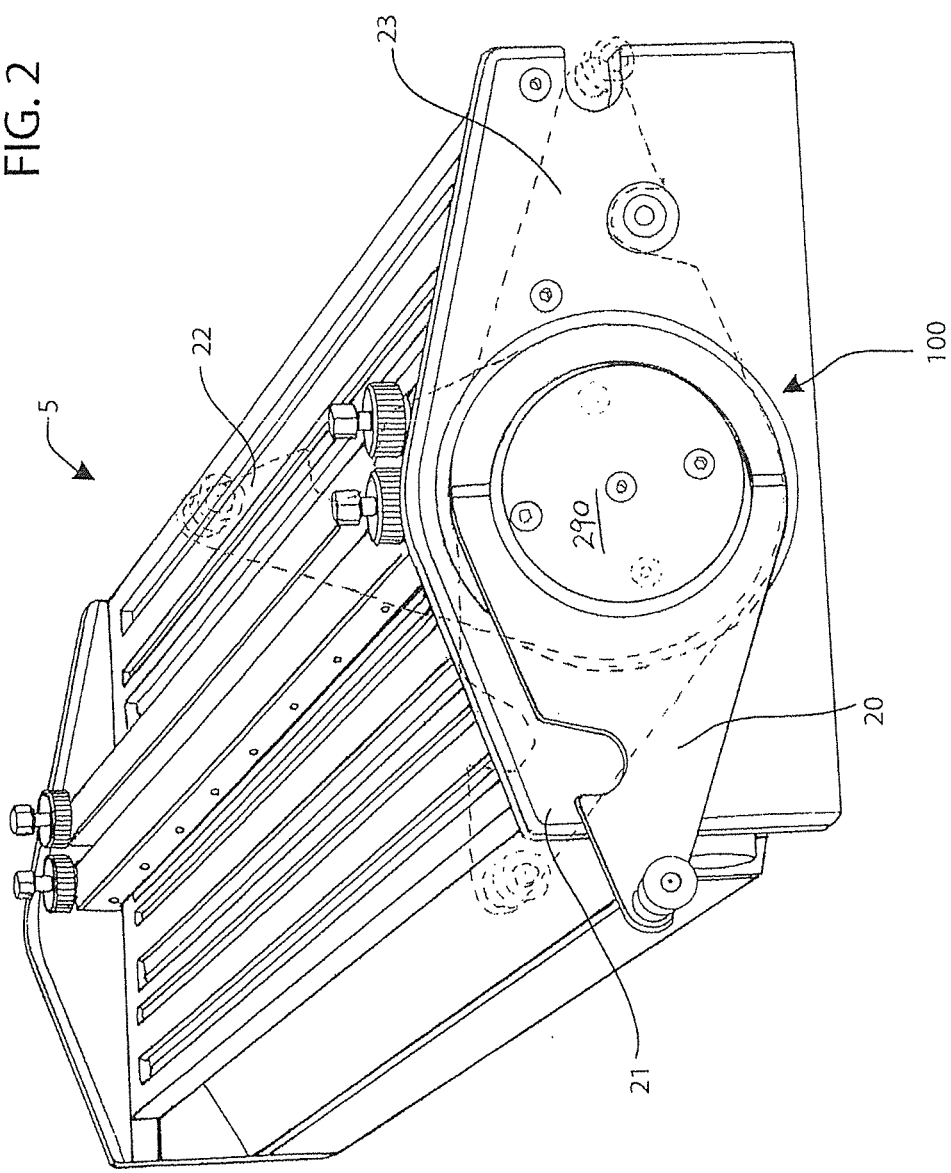
FIG. 2 is a perspective view of the belt welding apparatus of FIG. 1 showing the lever positioned in a belt joining operation position and showing in phantom different operation positions of the lever.
Figure 3:
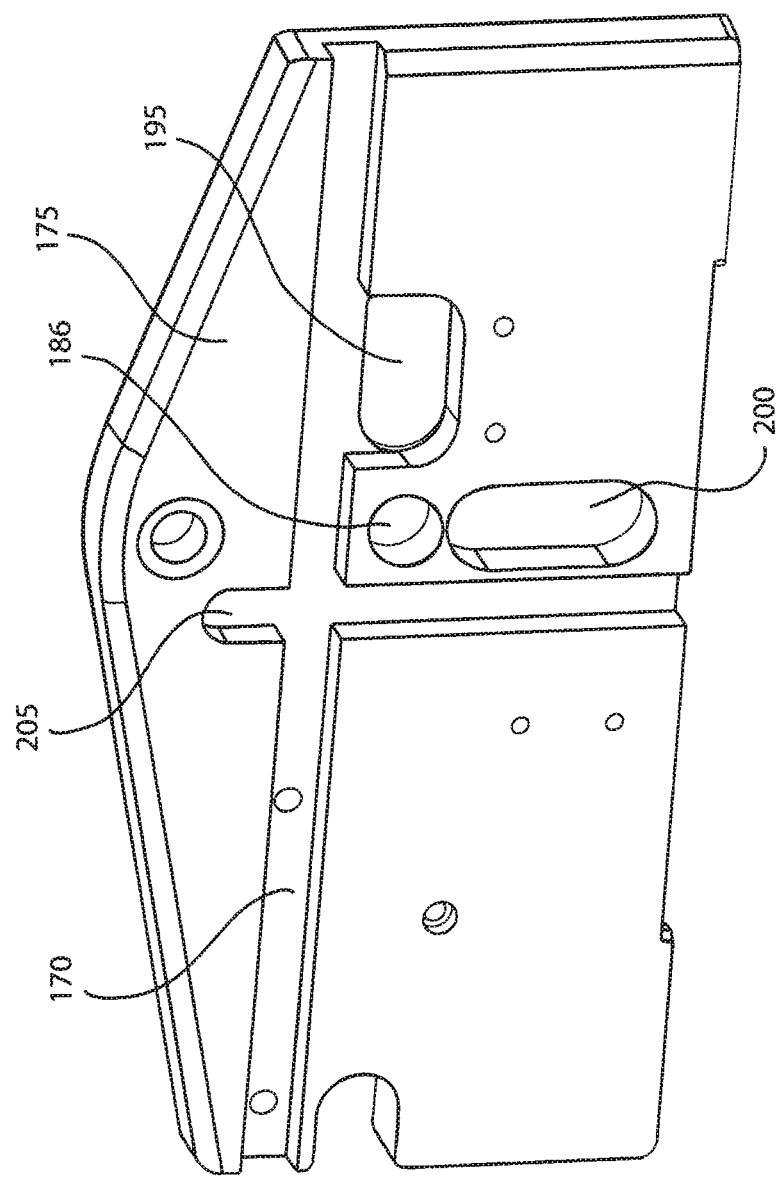
FIG. 3 is a perspective view of an end plate.
Figure 4:
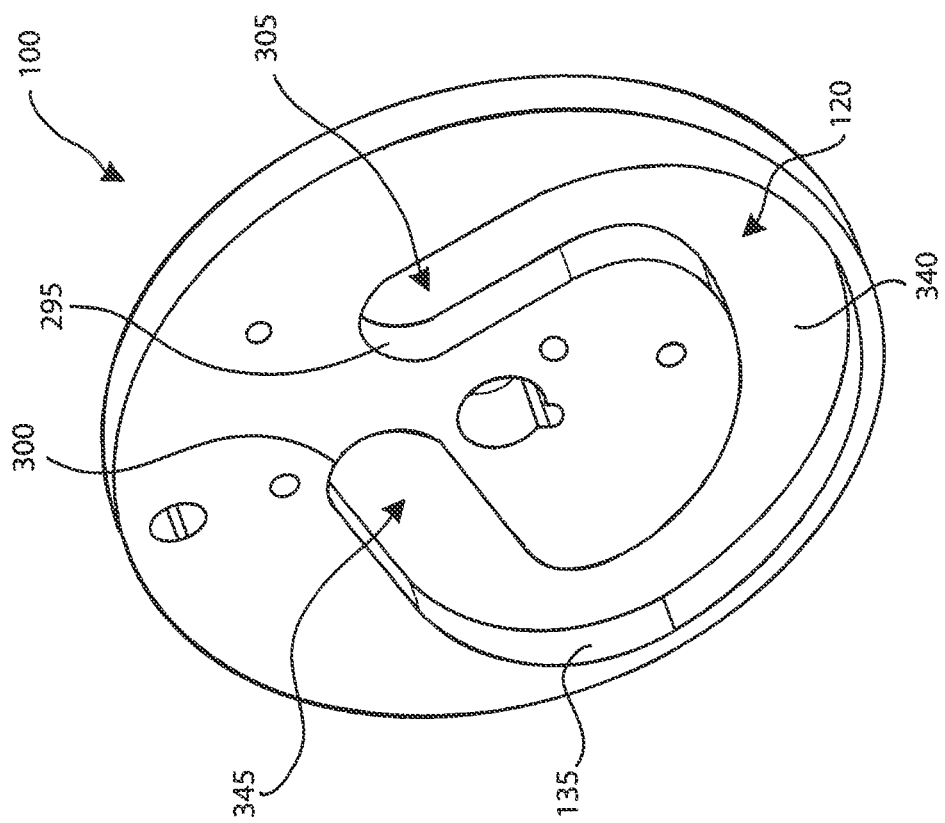
FIG. 4 is a perspective view of a cam disc having a generally U-shaped cam cutout.
Figure 5:
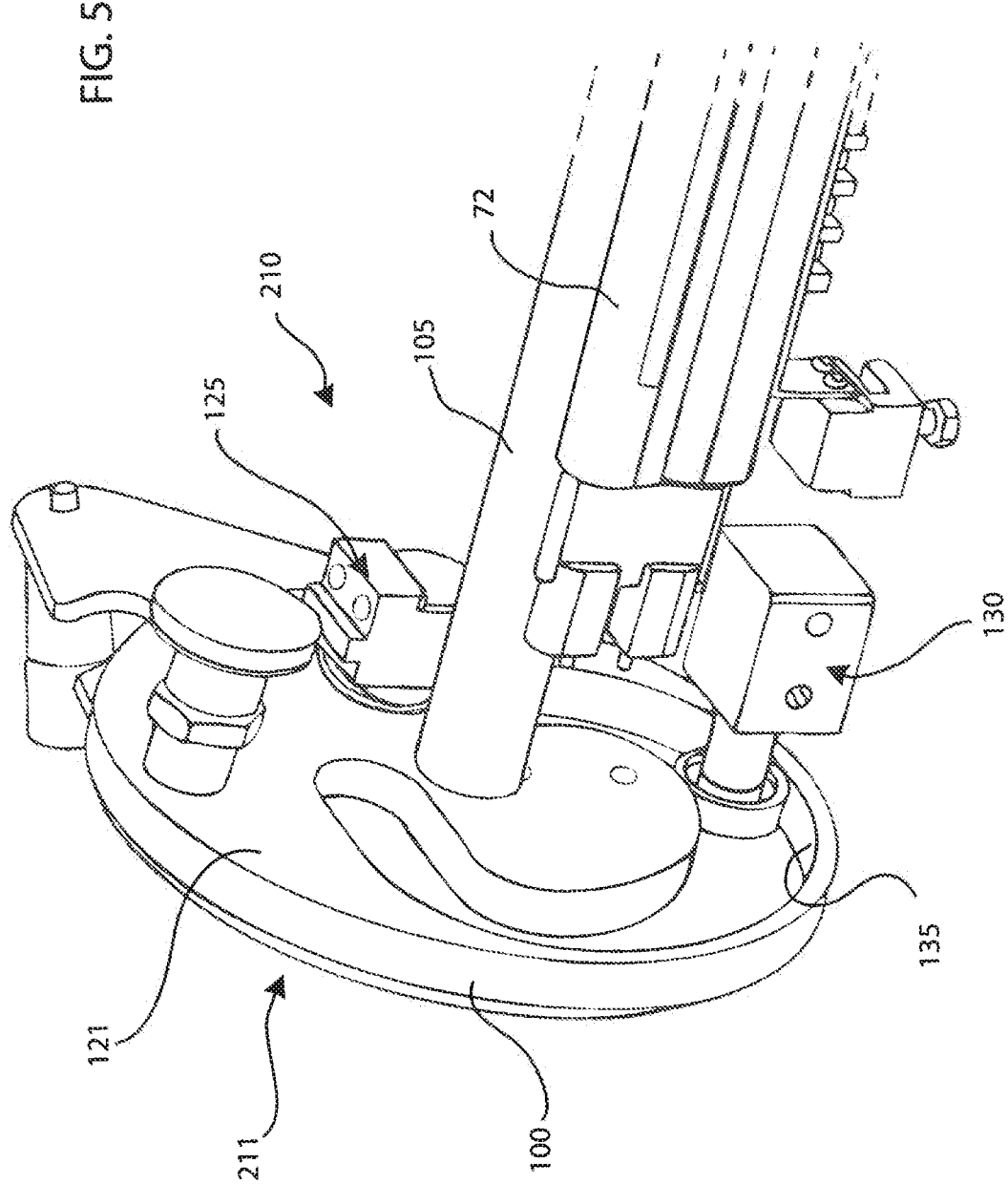
FIG. 5 is a perspective view of one end portion of the belt welding apparatus of FIG. 1 showing the location of the cam followers in the cam path when the lever is in the belt loading operation position.

In FIGS. 1 and 2 a belt welding apparatus 5 in accordance with one form is illustrated, which includes a belt support 6 for positioning the ends 35 and 40 of one or more conveyor belts (FIG. 3) in spaced relation from each other and a heating device 70 for being disposed between the belt ends 35 and 40 for melting a portion of the material thereof. The belt support 6 may include a pair of elongate platens 10 and 15 extending side-by-side in a lengthwise direction across the lateral width of the belt ends 35 and 40 for supporting the belt ends thereabove. At least one of the platens 10 is preferably movable laterally with respect to the other platen 15 for moving one of the belt ends 35 toward and away from the other belt end 40. The belt positioning platens 10 and 15, and particularly upper surfaces 25 and 30 thereof, are substantially horizontal and coplanar with one another. In this respect, the conveyor belt ends 35 and 40 can be loaded on the upper surfaces 25 and 30 of the positioning platens 10 and 15 when the platens are in a loading configuration, illustrated in FIGS. 5 and 8, such that the belt ends 35 and 40 are positioned in end-to-end relationship thereon. The platens 10 and 15 can be used to support the ends of one or more monolithic or positive drive conveyor belts 35 and 40 (shown), as well as other types of conveyor belt ends. With the belt ends 35 and 40 supported on upper surfaces 25 and 30 of the platens 10 and 15, clamping members 42 are provided for clamping the belt ends 35 and 40 against the upper platen surfaces 25 and 30. The clamping members 42 in the form of clamp bars 45 and 50 are positioned above the belt ends 35 and 40, respectively, and are tightly clamped to the upper platen surfaces 25 and 30 to tightly clamp the belt ends 35 and 40 therebetween to restrict movement of the belt ends 35 and 40 relative to the platens 10 and 15, respectively, during operation of the belt welding apparatus 5. In this regard, it should be noted that the belt welding apparatus 5 extends in a lengthwise direction across the lateral width of the belt so that the transverse center of the tool is disposed at the longitudinal ends 35 and 40 of the belt or belts to be joined together.

Figure 6:
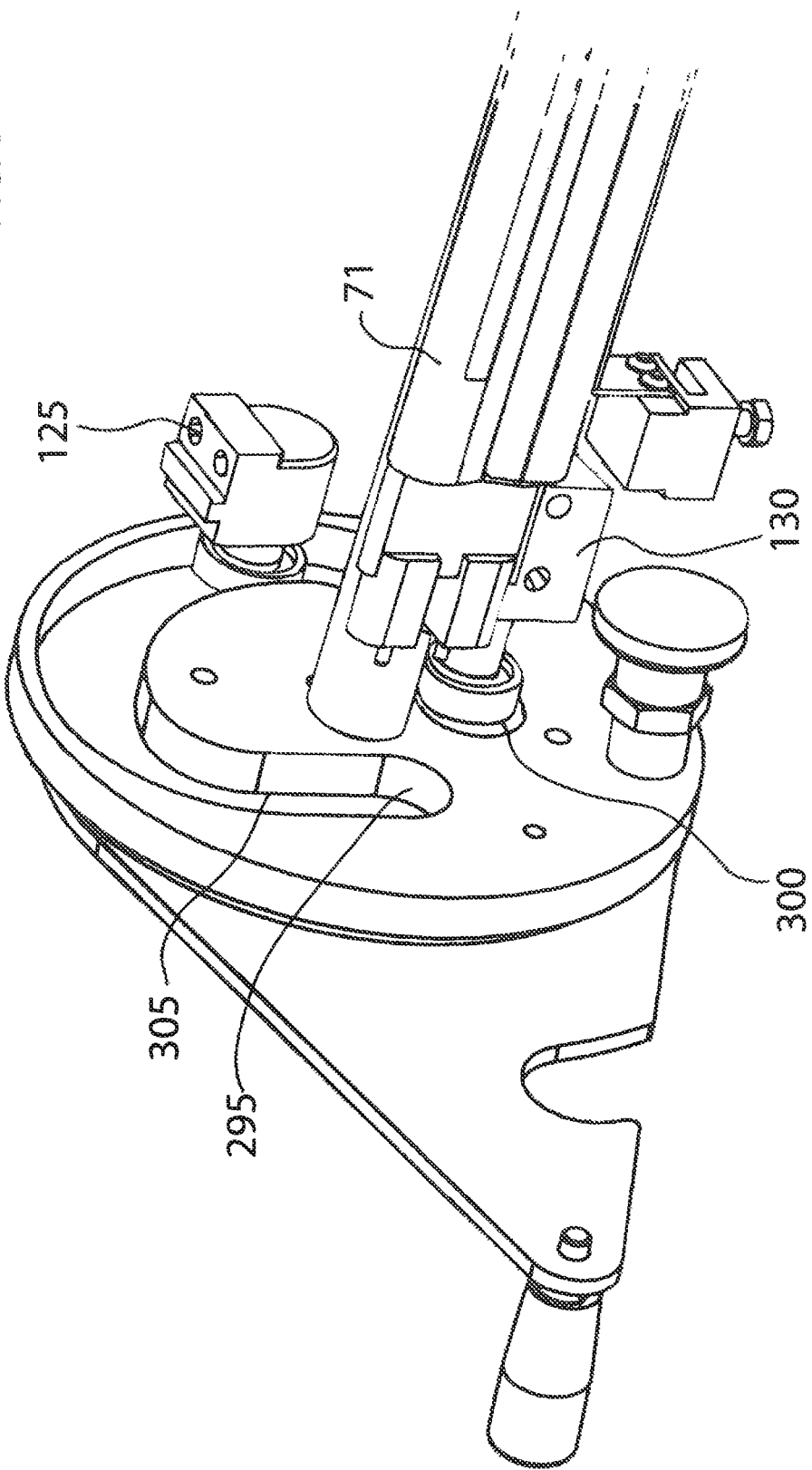
FIG. 6 is similar to the perspective view of FIG. 5 showing the location of the cam followers when the lever is in the belt heating operation position.
Figure 7:
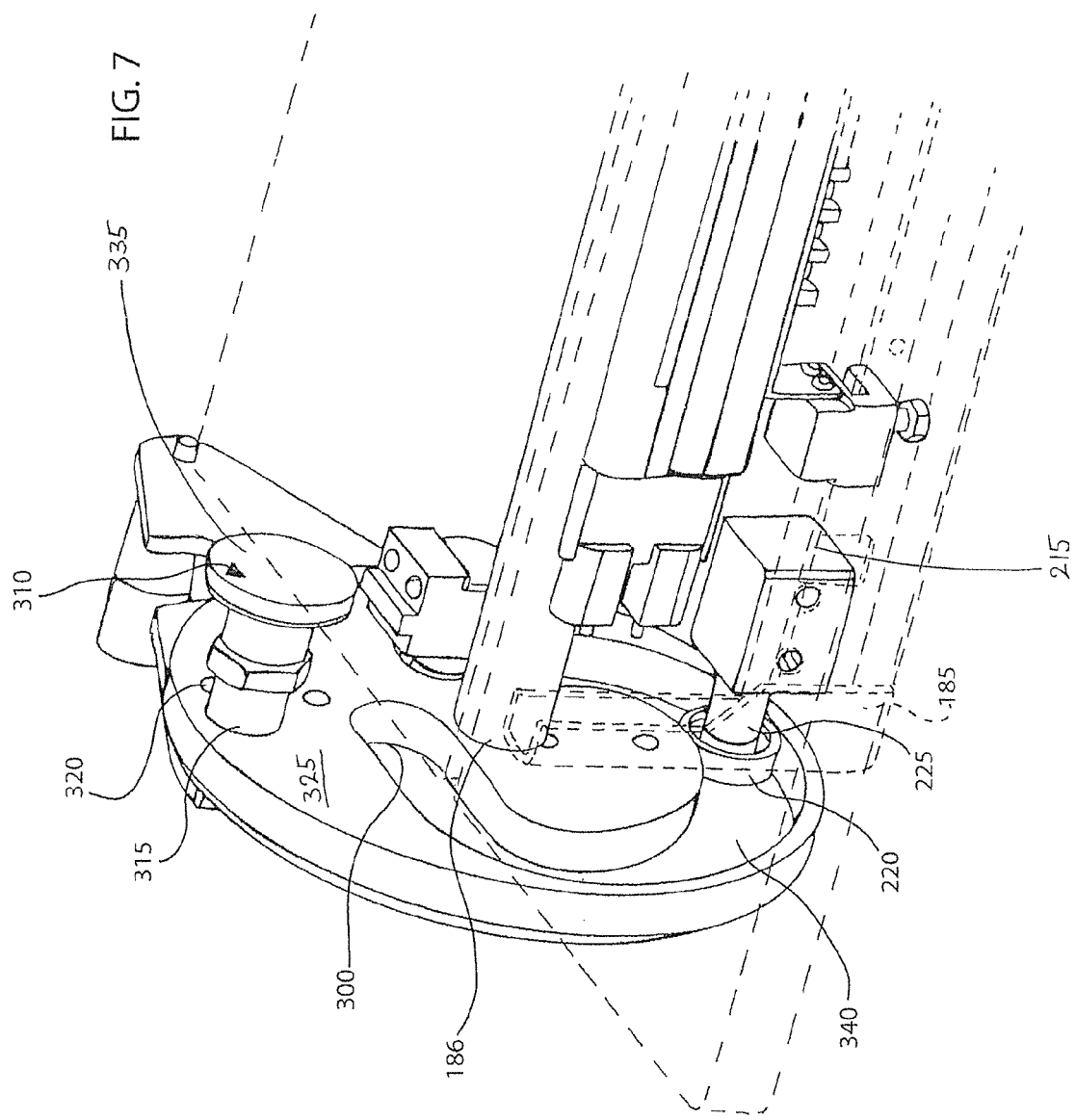
FIG. 7 is similar to the perspective view of FIG. 5 showing the location of the cam followers when the lever is in the belt joining operation position.
Figure 8:
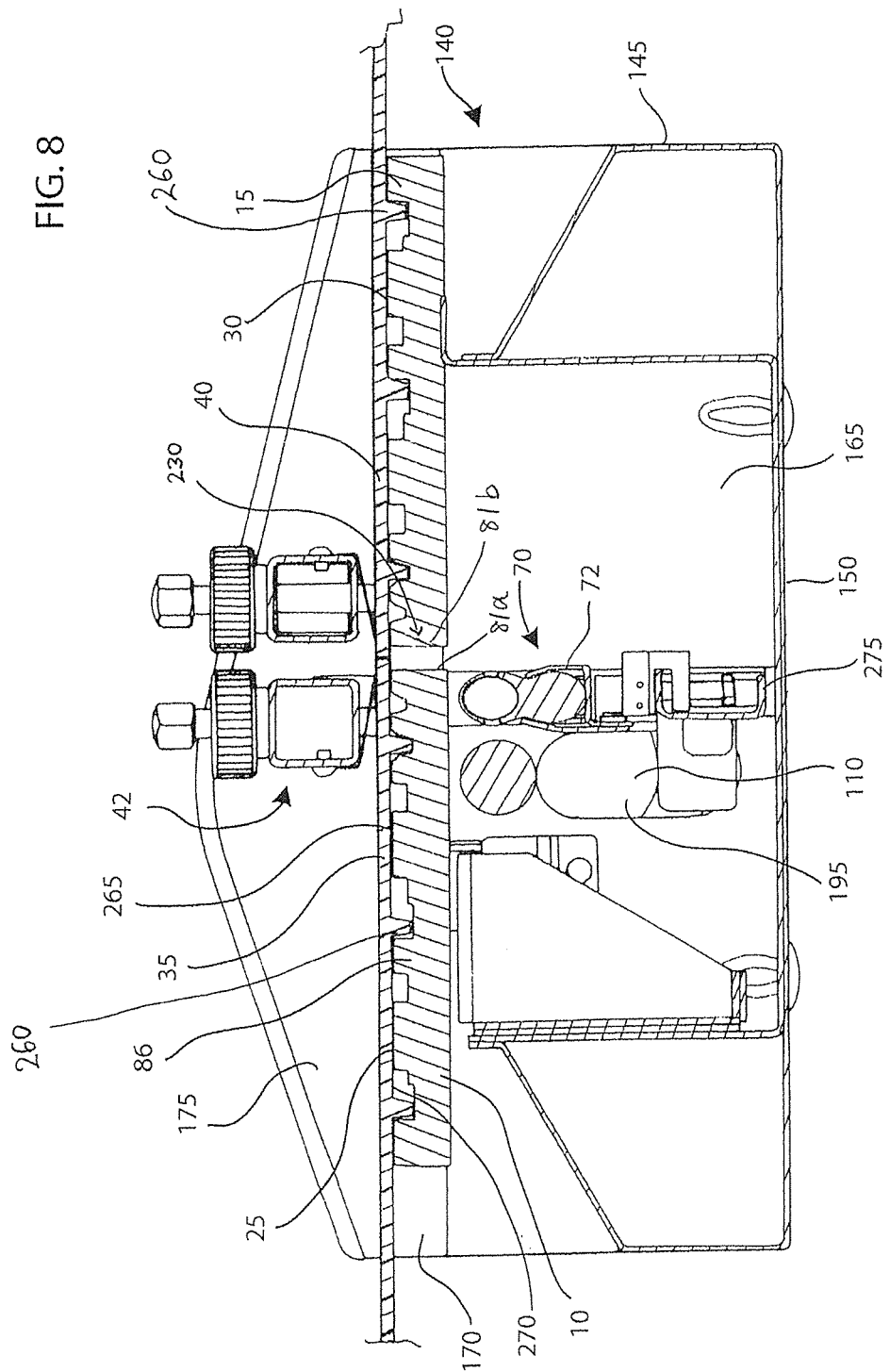
FIG. 8 is a cross-sectional view taken along line A-A of FIG. 1 showing the heating element in a lowered stowed position and the platens in a belt loading configuration relative to each other.
Figure 9:
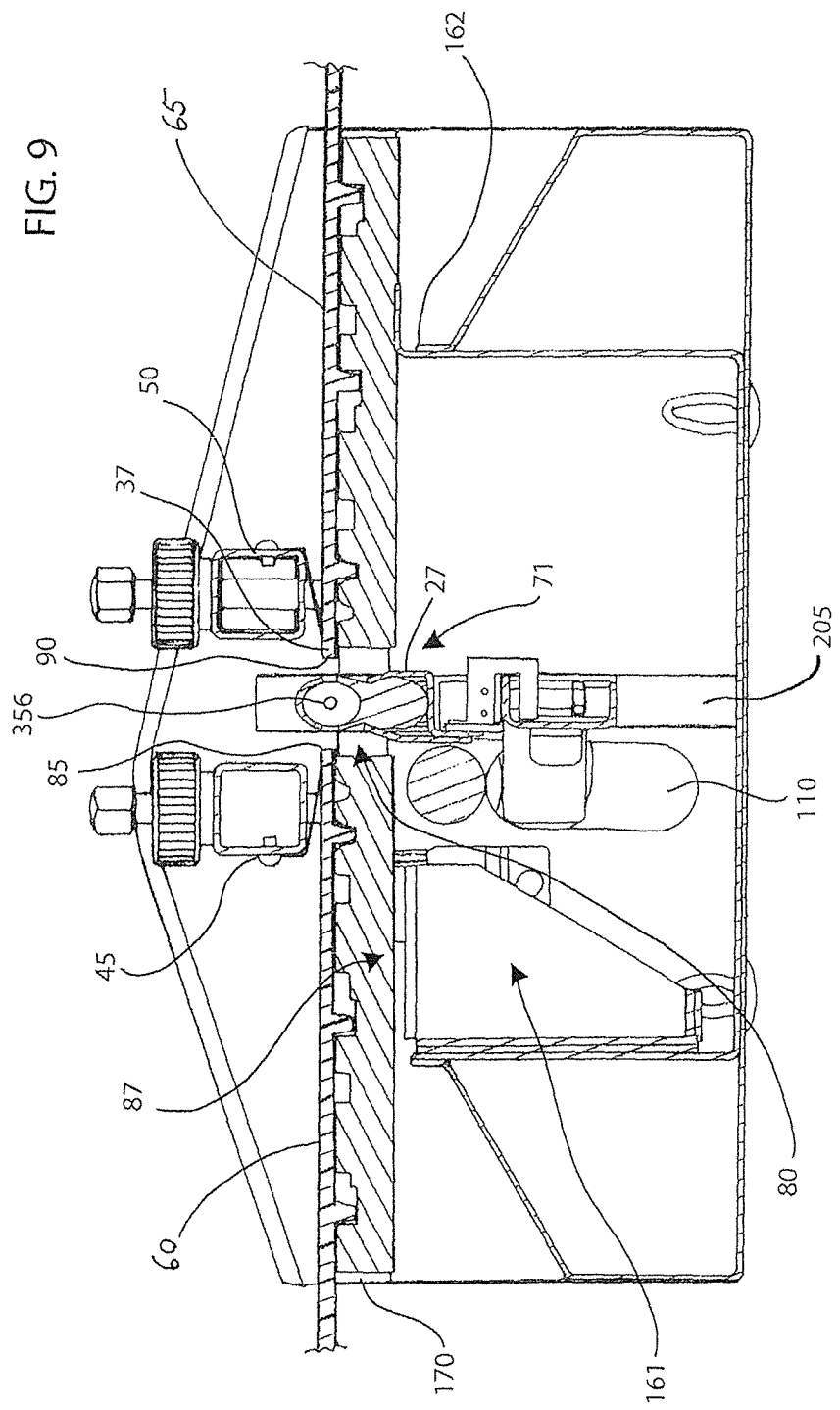
FIG. 9 is a cross-sectional view similar to FIG. 8 showing the heating element in a raised heating position and the platens spaced apart in a heating configuration relative to each other.
Figure 11:
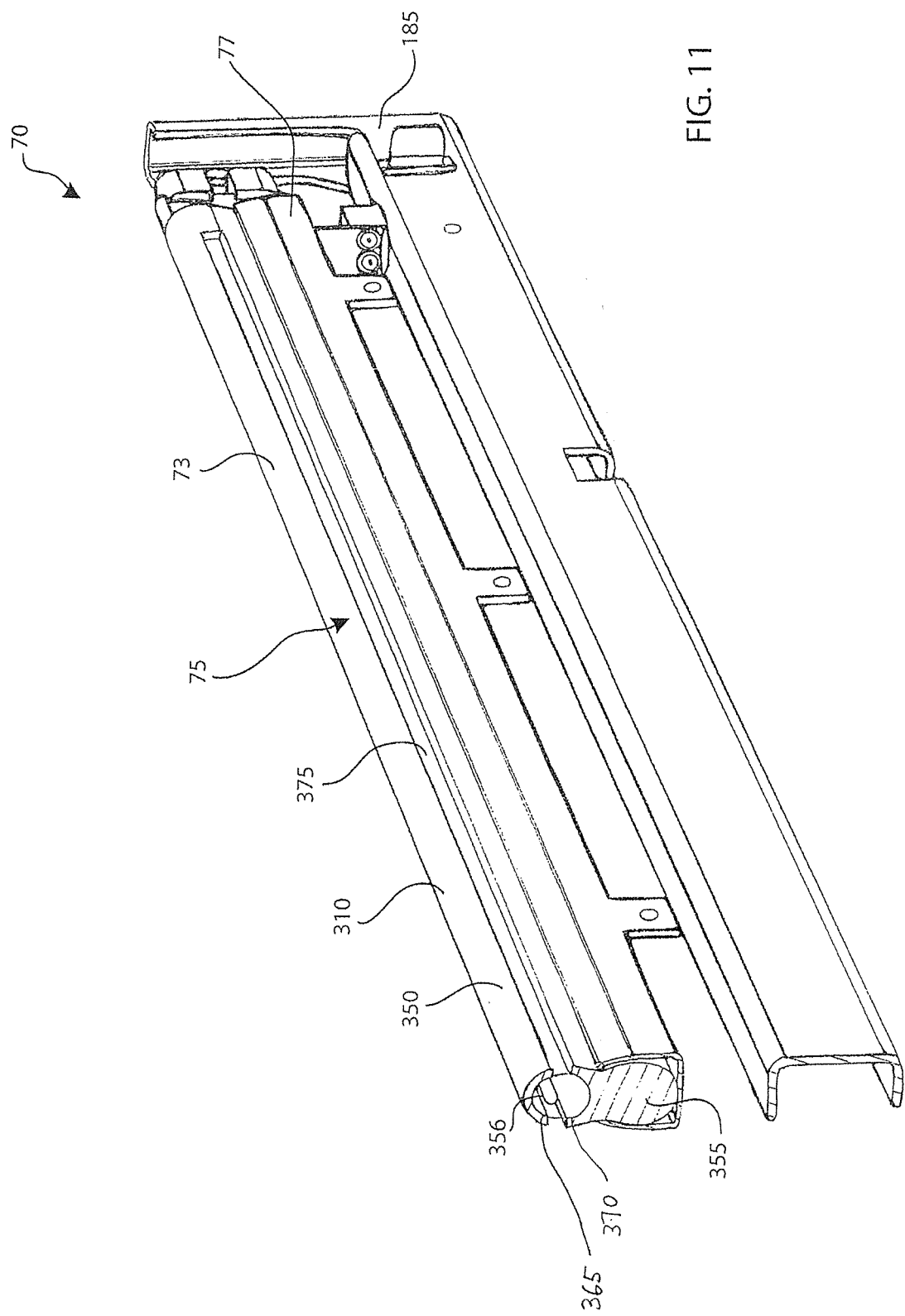
FIG. 11 is a cross-sectional perspective view of a heating device of the belt welder.
Figure 12:
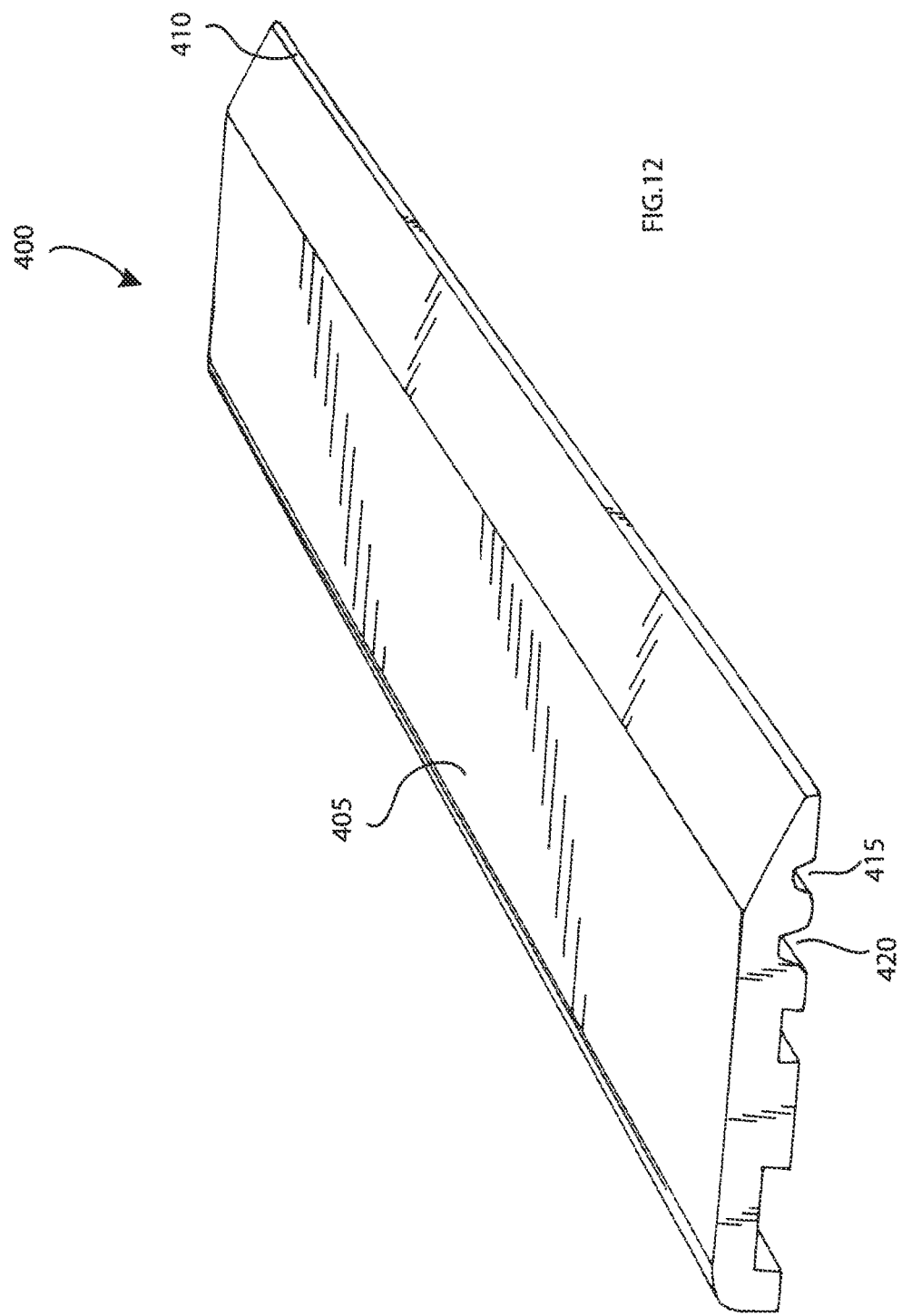
FIG. 12 is perspective view of a positive drive conveyor belt cutting template for cutting ends of positive drive belts to be joined with the present welding apparatus.
Figure 13:
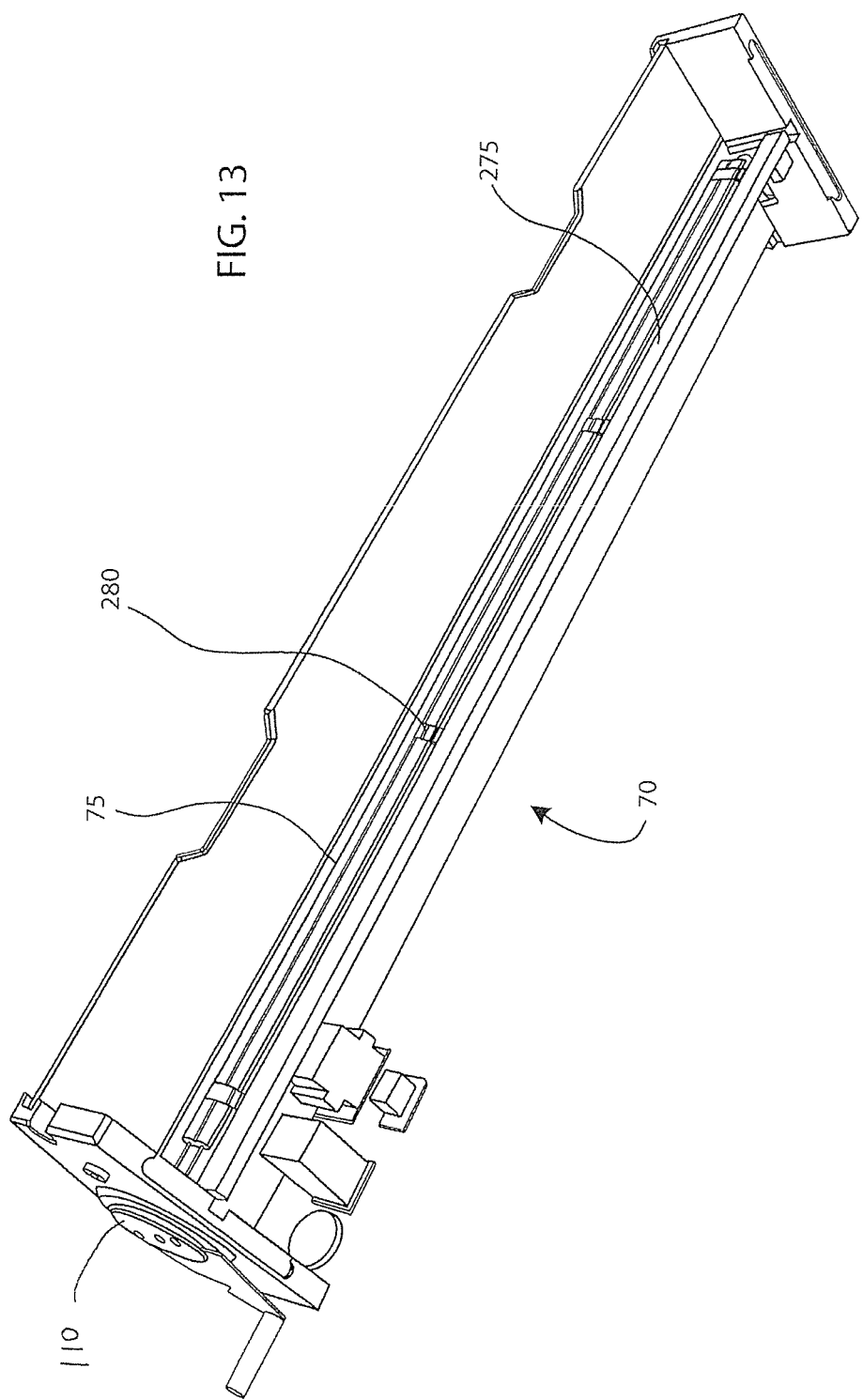
FIG. 13 is a perspective view of a welding apparatus according to another approach with the frame removed showing a heating device according to another approach.

Turning to FIGS. 8, 11, and 13, a heating device 70 extends in the lengthwise direction of the belt welding apparatus 5 and is movably mounted at each end thereof to a frame housing 140 and is movable between a raised heating position 71 (FIGS. 6 and 9), wherein the heating device 70 is disposed between the conveyor belt ends 35 and 40 and a lowered stowed position 72 (FIGS. 5 and 8), wherein the heating device 70 is removed from between the conveyor belt ends 35 and 40 so that the belt ends can be moved toward each other without interference by the heating device 70. In one form, in the stowed position, the heating device 70 is in a lowered stowed position within the frame housing 140, where the top portion 73 of the heating device 70 is positioned vertically below the bottom surfaces of the platens 10 and 15 so that the platens can be positioned over and substantially cover the heating device 70 in its stowed position. In the heating position with the platens 10 and 15 laterally spaced apart to provide clearance for the heating device 70, the heating device 70 is vertically raised so that the heating device 70 is positioned in a gap 80 formed between the platens 10 and 15 and is generally horizontally aligned with the belt ends 35 and 40. In this manner, the heating device 70 can be used to provide thermal radiation to the conveyor belt ends 35 and 40 to melt a portion of the material thereof. Melting of the belt material is used herein to refer to sufficient heating of the material so that the material is softened and capable of forming a weld or join between the conveyor belt ends. In one form, the heating device 70 includes a non-contact heater 75 and is laterally offset from the edges 85 and 90 of the belt ends 35 and 40 by a predetermined distance to provide a gap therebetween. The gap is sufficient to allow adequate thermal radiation transfer between the heater 75 and the belt edge portions 85 and 90 to adequately heat and melt the material at the belt edge portions 85 and 90, but to not overheat or burn the belt edges. In this regard, precise positioning of the heater 75 relative to the belt edge portions 85 and 90 can be controlled with a drive mechanism 210 described in more detail below. So configured, during heating, the belt ends 35 and 40 do not contact the surface of the non-contact heater 75 and instead the non-contact heater 75 emits thermal radiation across the gap to heat edge portions 85 and 90 of belt ends 35 and 40, thus preventing the loss of material therefrom that may otherwise occur due to sticking to the heater 75.

Figure 10:
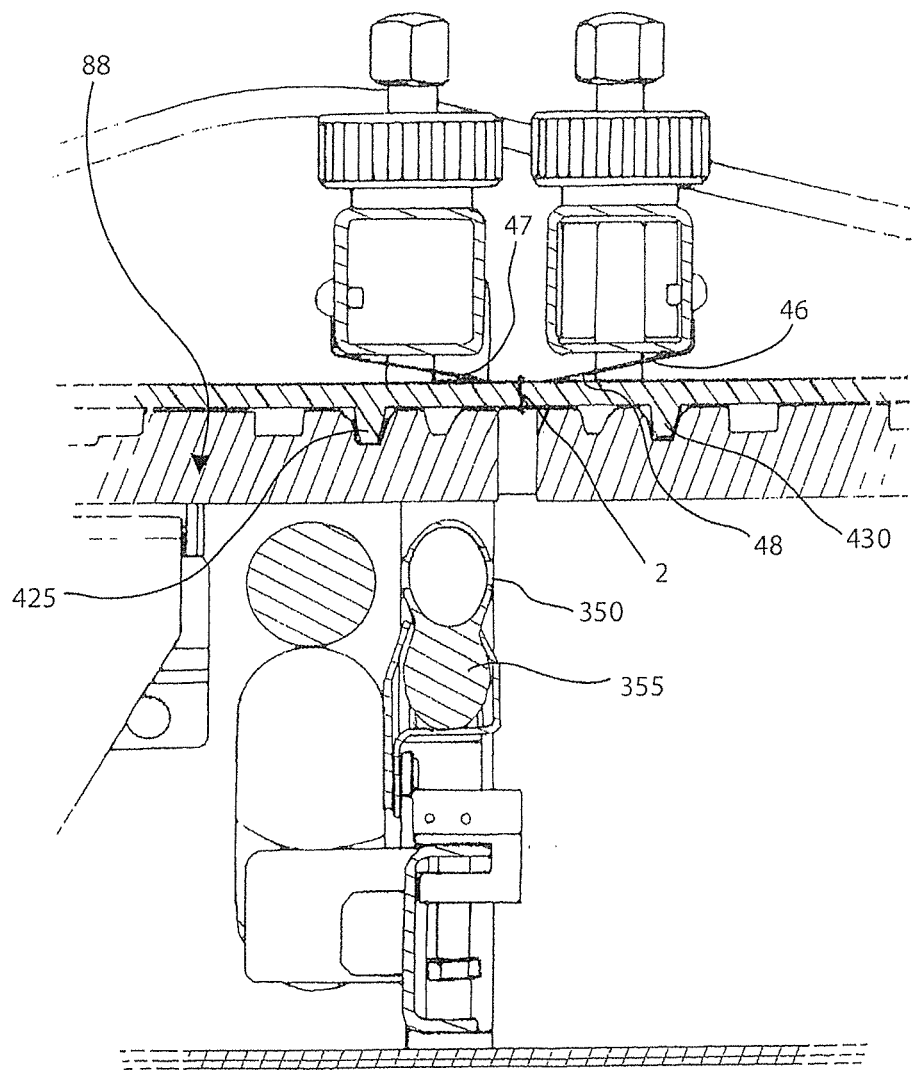
FIG. 10 is a cross-sectional view similar to FIG. 8 showing the heating element in a lowered stowed position and the platens in a belt joining configuration relative to each other.

The platens 10 and 15 are also movable between different positions relative to each other, including a belt loading position 86 (FIG. 8) a belt heating or melting position 87 (FIG. 9), and a belt joining position 88 (FIG. 10). In the belt joining position 88 the platens 10 and 15 are positioned closer laterally to each other than in the loading position 86 thereof, by a predetermined amount. In this manner, when the platens are moved to the joining position 88 the belt ends 35 and 40, and more particularly the edge portions 85 and 90 thereof, are urged toward one another by a predetermined distance beyond their original end-to-end arrangement so that the softened edge portions 85 and 90 clash together to overlap the belt ends 35 and 40 by a predetermined amount equal to the predetermined distance. The belts are preferably in end-to-end abutment in the loading position so that the distance the platens 10 and 15 move toward one another is equal to the belt overlap or clash when the belts are shifted to the belt joining position, however, the belt ends may be spaced in the loading position so that the amount of overlap is less than the amount the belt ends are shifted toward each other. For example, the predetermined amount may be between about 0.5 and about 2 mm. In one form, the predetermined amount is about 1.0 mm. Thus, after heating of the belt edge portions 85 and 90 to sufficiently melt the material, the melted material in the belt ends 35 and 40 intermixes so that upon cooling and hardening of the material, the belt ends 35 and 40 become fused to one another and their combined length is reduced by the predetermined amount.

The belt welding apparatus 5 includes a drive mechanism 210 for driving at least one of the platens 10 toward and away from the other platen 15 to move the platen 10 between the different operation positions thereof. The drive mechanism is also provided for shifting the heating device 70 between the raised heating position 71 and the lowered stowed position 72. A common drive mechanism 210 may be used for moving both the one platen 10 and the heating device 70, or separate drive mechanisms may be used. In one form, the drive mechanism includes a cam drive mechanism 211 for driving both the one platen 10 and the heating device 70 between different operation positions. A user operable actuator 94 is provided for operation of the cam drive mechanism 211. In one form, the actuator 94 and drive mechanism include a lever 95 disposed on a rotatable cam disc 100 and a drive coupler in the form of a connecting shaft 105 securely coupled to the cam disc 100 that extends longitudinally across the belt welding apparatus 5 and is securely coupled to a generally mirror image, second rotatable cam disc 110 positioned on the opposite longitudinal end so that the shaft causes the second rotatable cam disc 110 to generally rotate to the same extent as the first cam disc. In this manner opposite cam drive mechanisms 211 may be provided. Thus, upon rotation of the lever 95 using a handle 115 of the actuator extending therefrom, the cam discs 100 and 110 are rotated by substantially similar angles through rotation of the shaft 105.

The cam discs 100 and 110 each include cam cutouts 120 in their inner surfaces 121 that are programmed to provide movement of the movable platen 10 and the heating device 70 as the lever 95 is rotated. To this end, a pair of movable platen cam followers 125 and a pair of heating device cam followers 130 are mounted respectively to each longitudinal end of the movable platen 10 and the heating device 70, with the cam followers 125 and 130 disposed within the cam cutouts 120. Rotation of the cam discs 100 and 110 urges the cam followers 125 and 130 to follow outer and inner cam surfaces 135 of the cam cutouts 120, which in turn urges the movable platen 10 and the heating device 70 to move along a predetermined path as described in more detail below. In this manner, the movement of the platen 10 and heating device 70 to predetermined operative positions is controlled by the movement of a single handle 115 by an operator. In one approach, a single cam cutout 120 at each longitudinal end of the welding apparatus 5 is used for movement of both the movable platen 10 and the heating device 70, although more than one cam cutout may be used. If a single cam path is used, the cam followers 125 and 130 in this approach may both utilize separate active portions, 305 and 345 respectively, but may both share a single common inactive portion 340.

Turning to more of the details, in one aspect, the belt welding apparatus 5 includes a housing frame formed of a frame 140 with two longitudinally extending sidewalls 145 and a longitudinally extending bottom 150. Endplates 155 and 160 are positioned at each end of the frame 140. So configured, the frame 140 and the end plates 155 and 160 generally define an upwardly open heating device housing 165. The belt positioning platens 10 and 15 are located above the frame 140 and extend longitudinally between the end plates 155 and 160 to cover at least a portion of the heating device housing 165. The frame 140 may be formed from a metal material, including steel or aluminum that is preferably strong to provide support for the other components of the belt welding apparatus 5 and lightweight to facilitate portability of the belt welding apparatus 5.

The end plates 155 and 160 provide structural stability to the belt welding apparatus 5 and provide a position of mounting of several of the components of the welding apparatus 5. In one aspect, the end plates 155 and 160 each include at least one horizontally extending channel 170 on an inner surface 175 thereof that is sized to retain end portions 180 of the platens 10 and 15. The horizontal channels 170 are configured to allow lateral movement of the movable platen 10 toward and away from the stationary or fixed platen 15 between the inner welding position and the outer heating position thereof. The stationary platen 15 is also captured within the horizontal channel 170, but is securely attached to the endplates 155 and 160, so that during operation, the stationary plate 15 does not move laterally with respect to the belt welding apparatus 5.

The endplates 155 and 160 additionally include vertical channels 205 for slideably retaining heating device vertical guiderails 185, allowing vertical movement of the heating device 70 between the lowered stowed position 72 and the raised heating position 71, while restricting lateral or rotational movement of the heating device 70. A center mounting aperture 186 formed in each of the endplates 155 and 160 is utilized for mounting the two ends 190 of the shaft 105 and to allow rotation of the shaft 105 therein. The end plates 155 and 160 additionally includes a pair of cam follower slots 195 and 200 formed through each of the end plates 155 and 160 for allowing a portion of the respective cam followers 125 and 130 to pass therethrough and move relative to the end plates 155 and 160 during movement of the cam followers 125 and 130.

To this end, the end plates 155 and 160 are preferably formed from a relatively strong material, which provides a smooth low friction surface and good abrasion resistance, along with providing relatively strong structural support to the belt welding apparatus 5, for example acetyl or polyoxymethylene (POM). In this manner, the shaft 105 is easily rotated by the user within the mounting apertures 186, and the inner surfaces of the mounting apertures 186 do not become quickly worn with use of the belt welding apparatus. Similarly, forming the end plates 155 and 160 of a material with these properties provides good abrasion resistance to minimize wear caused by the lateral movement of the movable platen 10 within the platen channels 170 and from vertical movement of the heating device guide rails 185 within guide rail vertical channels 205, both formed in the inner surfaces 175 of the end plates 155 and 160. It also minimizes wear from the cam followers as they move within the cam follower slots 195 and 200 formed through, the end plates 155 and 160.

In one aspect, the drive mechanism 210 is configured for moving the movable platen 10 and the heating device 70 between operative positions. In one example, the drive mechanism 210 includes an actuator 94 in the form of a handle 115 disposed on and extending from the lever 95 that is attached to the first end disc 100. As mentioned previously, the shaft 105 is coupled to the inner surface 121 of the first rotatable cam disc 100 and extends longitudinally across the belt welding apparatus 5 where it is coupled to the second rotatable cam disc 110 located at the opposite longitudinal end of the belt welding apparatus 5 so that a pair of cam disc drive mechanisms 211 are provided. In this configuration, the lever 95 is rotatable along an arcuate pathway, and rotation of the lever 95 by a particular angle using handle 115 rotates the first rotatable cam disc 100 by a corresponding angle, which drives the shaft to provide an equal angle of rotation in the second rotatable cam disc 110.

In one aspect, each rotatable cam disc 100 and 110 is formed with cam cutouts 120 on inner surfaces thereof that are programmed to drive corresponding platen cam followers 125 and heating device cam followers 130 between different operative positions. In this regard, cam followers 125 and 130 are coupled to each longitudinal end of the movable platen 10 and the heating device 70, respectively, and ride within the cam cutouts 120 during rotation of the rotatable cam discs 100 and 110. In this regard, rotation of the lever 95 by an operator, through its entire range of motion, causes corresponding movement of both the movable platen 110 and the heating device 70 during operation of the belt welding apparatus 5. To this end, the cam cutouts include cam surfaces 135 that provide driving surfaces for the cam followers 125 and 130. Thus, as the rotatable cam discs 100 and 110 are rotated, the cam followers 125 and 130 ride along the cam surfaces 135 along the path defined by the cam cutouts 120 that coordinate to the desired movement of the movable platen 10 and the heating device 70.

In one aspect, a pair of platen cam follower assemblies 125 are mounted on each longitudinal end of the movable platen 10 and a pair of heating device cam follower assemblies 130 are positioned on each longitudinal end of the heating device 70. The cam follower assemblies 125 and 130 are preferably roller bearing cam follower assemblies and each include a mounting block 215 to mount the cam follower assemblies 125 and 130 respectively to the longitudinal ends of the movable platen 10 and the heating device 70. The cam follower assemblies each also include a cam follower roller 220 that is positioned within the cam cutouts 120 and a cam follower shaft 225 that connects each cam follower roller 220 to its mounting block 215. Ball bearings are located at the interface between the cam follower roller 220 and the cam follower shaft 225, so that the circumferential surface of the cam follower roller 220 can roll along the cam surfaces 130.

As described above, first and second cam follower slots 195 and 200 are formed through the end plates 155 and 160 and the cam followers 125 and 130 are configured so that the cam follower rollers 220 thereof are positioned on an outer side of the end plates 155 and 160, within the cam cutouts 120, the mounting blocks 215 are located on an inner side of the end plates 155 and 160 and attached to one of the movable platen 10 and the heating assembly 70, and the cam follower shafts 225 extends through one of the cam follower slots 195 and 200 to mount the cam follower rollers 220 to the cam follower mounting blocks 215. The cam follower slots 195 and 200 are configured to facilitate the movements of the cam followers 125 and 130 during movement of the cam followers 125 and 130 along the paths defined by the slots.

In one aspect, the actuator or lever 95 is in the form of a generally triangular lever that is rotatably coupled at its end to the center of the rotatable cam disc 100. A semicircular cutout 240 allows the handle to be in an operative position wherein the handle extends orthogonally away from the rotatable cam disc 100, and can be flipped along axis 235 to a storage position, wherein the handle 115 extends orthogonally inward from the lever 95 toward the opposite rotatable cam disc 110 and fits within the handle receiving cutout 240 formed in the end plate 155. In this regard, during transportation of the belt welding apparatus, the handle 115 can be positioned toward the center of the belt welding assembly, so that it does not protrude outwardly, to prevent the handle 115 from becoming damaged or struck during movement or causing accidental rotation of the lever 95 during transportation of the belt welding apparatus 5.

In one aspect, as mentioned previously, one of the platens 10 is laterally movable between a welding position 88, wherein the movable platen 10 is positioned in close proximity to the stationary platen 15, and a heating position 87 wherein the movable platen 10 is spaced laterally away from the stationary platen 15 so that a gap 80 is formed between the adjacent edges of the platens 10 and 15. The other platen is the stationary platen 15 and is rigidly secured at both ends to the end plates 155 and 160 so that it remains laterally fixed as the movable platen 10 moves relative to its fixed orientation.

As mentioned previously, the platens 10 and 15 are preferably elongate platens with generally flat upper surfaces 25 and 30 that may include structures for receiving positive drive bars. When mounted at both ends in the horizontal channels 170 on the end plates 155 and 160, the platen upper surfaces 25 and 30 should be substantially horizontally aligned with one another. In this configuration, when the movable platen 10 is in the loading position, conveyor belt ends 35 and 40 can be positioned on the upper surfaces 25 and 30 with their edges 85 and 90 positioned in end-to-end abutment and being substantially horizontally aligned with one another so that during welding, substantially the entire thickness of the belt edges 85 and 90 will contact one another, so that the belt edges 85 and 90 are not vertically offset from one another. In one example, the platens 10 and 15 are formed from a lightweight material that provides rigid support for the belts, for example aluminum. Intermediate supports 161 and 162 are preferably provided for supporting the platens 10 and 15 along their lengths. One of the intermediate supports 161 may be adjustable to shift an intermediate portion of the movable platen up or down to configure the platen upper surfaces 25 and 30 to be generally coplanar. An actuator is provided for shifting the adjustable intermediate support 161 up and down. The intermediate support 161 should have an upper surface formed of a smooth and low friction material having good abrasion resistance to facilitate sliding movement of the movable platen 10 thereover and to reduce wear on the upper surface caused by rubbing between the movable platen 10 and the upper surface during the sliding movement.

Elongate clamping bars 45 and 50 may be positioned above each of the platens 10 and 15 at laterally inner portions 230 thereof and are configured to engage the belt upper surfaces 60 and 65 in close proximity to the belt edges 85 and 90. A clamp actuator 246 is provided for urging the clamping bars 45 and 50 toward the belt ends 35 and 40 to tightly clamp the belt ends between the clamping bars 45 and 50 and the platen upper surfaces 60 and 65. In one form, the clamp actuator includes a pair of clamp bolts 55 that extend upwardly from each of the platens at the laterally inside portions 230, and are positioned longitudinally along the platens to correspond to the positions of outwardly open slots 245 at each end of the clamping bars 45 and 50. So configured, with the clamping bars 45 and 50 in their clamping positions, the outwardly open slots 245 receive the clamp bolts 55. Threaded nuts 250 are coupled to the bolts, and can be tightened on corresponding threaded portions of the bolts 55 to urge the clamping bars 45 and 50 into tight engagement with the belt upper surfaces 60 and 65 above the inside portions 240 of the platens 10 and 15.

Elongate clamping bars 45 and 50 may be positioned above each of the platens 10 and 15 at laterally inner portions 240 thereof and are configured to engage the belt upper surfaces 60 and 65 in close proximity to the belt edges 85 and 90. A clamp actuator 246 is provided for urging the clamping bars 45 and 50 toward the belt ends 35 and 40 to tightly clamp the belt ends between the clamping bars 45 and 50 and the platen upper surfaces 60 and 65. In one form, the clamp actuator includes a pair of clamp bolts 55 that extend upwardly from each of the platens at the laterally inside portions 240, and are positioned longitudinally along the platens to correspond to the positions of outwardly open slots 245 at each end of the clamping bars 45 and 50. So configured, with the clamping bars 45 and 50 in their clamping positions, the outwardly open slots 245 receive the clamp bolts 55. Threaded nuts 250 are coupled to the bolts, and can be tightened on corresponding threaded portions of the bolts 55 to urge the clamping bars 45 and 50 into tight engagement with the belt upper surfaces 60 and 65 above the inside portions 240 of the platens 10 and 15.

So configured, the clamping bars 45 and 50 are in close proximity to the belt edges 85 and 90 to securely maintain the belt edges in an operative position and to restrict the belt ends 35 and 40 from deflecting away from one another during welding of the belt ends 35 and 40 as they are urged toward one another. The clamping bars 45 and 50 may also include bottom elongate spring members in the form of cantilever springs 46 that extend downward and away from one corner of the clamping bar 45 and 50 bottom surfaces in their naturally biased position. In this manner, with the clamping bars 45 and 50 tightened against the belt surfaces 60 and 65, even if the center portion of the clamping bar bows away from the belt surfaces 60 and 65 during operation due to end portions thereof being tightly clumped downwardly by the clamp actuators 246 the cantilever spring portions 46 will tightly engage the upper belt upper surfaces 60 and 65 with thin edge portions 47 thereof, maintaining the portions of the belt ends 35 and 40, near the edge portions 85 and 90 thereof, in tight engagement with the platen upper surfaces 25 and 30 during operation of the belt welding apparatus 5 so that the belt ends 35 and 40 remain substantially coplanar with eachother.

In one form, the cantilever springs 46 include end portions 48 for engaging the belt ends 35 and 40 that extend laterally inwardly beyond the clamping bars to engage the belt surfaces with the clamping bars 45 and 50 in the clamping position. In this regard, the clamping bars 45 and 50 are preferably laterally offset outwardly from platen edge portions 81a and 81b. In this manner, when the heating device 70 is raised in the heating position 27, the clamping bars 45 and 50 are positioned further away from the heating device than the edge portions 85 and 90 of the belt ends 35 and 40 so that the clamping bars 45 and 50 do not draw a substantial amount of heat away from the belt ends 35 and 40. In this manner, a smaller amount of heat is required to be provided to sufficiently melt the materials on the belt ends than would otherwise be required if the clamping bars 45 and 50 acted as a heat sink to draw heat away from the belt ends. In addition, offsetting the clamping bars 45 and 50 away from the heating device 70 reduces the heating of the clamping bars 45 and 50 and the deformation of the clamping bars that this may otherwise cause so that the clamping bars effectively provide uniform pressure to clamp the belt ends and maintain them at approximately coplanar relationship to each other. The clamping bars 45 and 50 are preferably formed of a material having a low thermal absorption to reduce the amount of thermal radiation they absorb. The clamping bars 45 and 50 are polished to further reduce their radiation absorption. In one form the clamp bars 45 and 50 predetermined material has a low coefficient of thermal expansion to reduce bowing caused by thermal radiation heating an inner edge portion of the clamp bars. In one example, the predetermined material is stainless steel.

In one aspect, the platen structures in the form of a series of narrow grooves or recesses 255 extend longitudinally across the platen upper surfaces 25 and 30 to facilitate use of the belt welding apparatus 5 with positive drive belts 265. The platen structures, e.g. recesses 255 are sized to receive the ribs 260 of specific positive drive belts 265, and are separated by a longitudinal distance from one another that corresponds to the pitch of the positive drive belts 265 that are supported by the welding apparatus 5. More specifically, the first recess 255 of each platen 10 and 15 adjacent to the welding site is sized so that the trapezoidal ribs 260 adjacent to the welding site form tight mating fits in the first recesses 255. Upon engaging the clamping bars 45 and 50 against the upper surfaces 60 and 65 of the belt ends 35 and 40, the first ribs 260 are locked and tightly held against shifting in the longitudinal direction of the belts during operation of the belt welding apparatus 5.

The remaining recesses 255 are sized to provide sufficient clearance for their corresponding remaining ribs 260 so that the ribs 260 can be easily inserted into the recesses 255. In this regard, the belt ends 35 and 40 of one or more positive drive belts 265 can be positioned with their downwardly extending ribs 260 received in the recesses 255 so that the lower surfaces 270 of the belts 265 are positioned flat against the upper surfaces 25 and 30 of the platens 10 and 15. In this manner, the belt ends 25 and 30 are maintained in their corresponding horizontally aligned relationship even with their downwardly extending ribs 260, so that the belt edges 85 and 90 can abut end-to-end across substantially their entire thickness and are not vertically offset from one another. The platens 10 and 15 may include a plurality of sets of grooves corresponding to positive drive belts having different pitches and rib sizes to accommodate more than one type of positive drive belt.

With the belt ends 35 and 40 mounted on the platens 10 and 15 and the platens in the loading position, the belt ends 35 and 40 are configured to overhang the platen edge portions 81*a* and 81*b*. The amount of belt overhang 37 is typically at least equal to the amount of the belt ends that will be overlapped and clashed together during belt joining so that the belt ends may be joined together without the platens 10 and 15 engaging each other and restricting lateral movement of the belt ends 35 and 40 toward each other. Preferably, the amount of belt overhang 37 in the overhang portion is greater than the amount of clash so that during the belt heating operation, with the platens belt ends separated from each other, the platen edge portions 81*a* and 81*b* are offset away from the heating device 70 further than the belt edges 85 and 90. In this regard, the amount of heat loss due to heat transferring from the belt ends 35 and 40 to the platens 10 and 15 is reduced, while the platens 10 and 15 still provide support for the belt ends so that the belt ends do not become vertically offset from one another which could otherwise result in a weld being formed with a surface discontinuity.

In one form, the heating device 70 includes an elongate heater 75, coupled to an elongate support bar 275 by heater clamps 280. The support bar 275 is preferably formed of a rigid material that restricts deflection of the support bar 275 thereby preventing deflection or bowing of the elongate heater 75. In this regard, the heater 75 is maintained in a generally linear orientation extending parallel to the belt edges 85 and 90. In a preferred form, the heater 75 is a non-contact heater that provides thermal radiation to the belt ends 85 and 90 across an air gap since the heater 75 is spaced from the belt ends. The preferred infrared heater heats the edges 85 and 90 spaced therefrom through radiation to restrict melted material sticking to the heater 75. In one aspect, the elongate heater 75 is spaced at generally equal distance from the belt edges 85 and 90 along their entire lateral widths. As mentioned, the heater 75 may be coupled to the support bar 275 by at least one clamp 280 that receive the heater 75 in snap-fit reception therein to allow removal and replacement of the heater 75 from the heating device 70.

In another form, the heating device 70 includes an elongate heating support member 77 that extends longitudinally and the heater 75 is mounted thereto. The heater may include a tubular heat transmissive housing having a heating filament 356 extending therein. In one form, the infrared bulb may have a generally FIG. 8 configuration with an active upper tubular housing or bulb 350 and a lower inactive tubular housing or bulb 355 so that the lower tubular housing 355 may be clamped or held by the support member 77 without interfering with infrared radiation being emitted from the upper bulb tube. The elongate bulb support member 77 is preferably formed from a rigid material having a low coefficient of thermal expansion that is slightly greater than the coefficient of thermal expansion of the bulb tube material. In one example, the bulb tube is formed from quartz, having a coefficient of thermal expansion of about $0.59 \times 10^{-6}/° C$. The bulb support member in this example is formed of Invar, which has a coefficient of thermal expansion of about $1.2 \times 10^{-6}/° C.$, which is slightly greater than the low coefficient of thermal expansion of the quartz bulb member. Because the support is spaced from the bulb, even though it has a slightly greater coefficient of thermal expansion than the bulb, they will deform by about the same amount during heating operations. In this manner, due to the high operation temperatures of the infrared bulb during operation thereof, neither the quartz tube, nor the Invar support member 77 will undergo considerable thermal expansion or deformation, to reduce the stress caused by the deformed support on the bulb to avoid damaging or breaking the quartz material of the bulb. In addition, the elongate support member 77 of rigid material provides support to the bulb along its entire length so that during transportation, if the belt welding apparatus is roughly treated, the support member will absorb large sheer or impact forces to protect the bulb and restrict the bulb from becoming broken or damaged. The bulb member is formed of a thermal radiation transmitting material, e.g. quartz.

The heater 75 may be coated with a gold surface coating 310 that acts to reflect the infrared radiation from the infrared heater to minimize the amount of radiation that is not directed toward the belt ends. Upper and lower portions 365 and 370 are preferably coated with infrared heat resistant material, including a gold coating material. To this end, elongate opposite side edge portions of the bulb may remain uncoated so that an elongate slot 375 of uncoated material is formed for allowing infrared heat to pass therethough therefrom. During heating, the uncoated slot portion is preferably positioned adjacent to the belt ends to direct the infrared heat the belt ends while the coating reduces the amount of heat lost and the heating of the other portions of the belt welder 5. It has been found that in horizontal applications using a non-contact or infrared heating bulb, gravity can result in the filament becoming off-centered and located below the horizontal center of the upper bulb portion. Thus, in one form, the elongate uncoated side portions are offset below the vertical center of the bulb to be substantially adjacent to the filament to maximize the amount of infrared radiation that is directed toward the slots 375 and the belt ends 35 and 40 that are positioned adjacent thereto.

In one form, the infrared heater includes an elongate generally cylindrical chamber or tube formed from an infrared radiation conducting material, e.g. quartz. An infrared filament 356 extends within the elongate quartz tube. Spacers are positioned at intervals along to maintain the filament. Previous bulbs infrared heating bulbs include dimples for maintaining the spacers in position so that the bulbs can be used in vertical applications. However, these dimples have been found to interfere with the pattern of radiation being emitted from the heater. Thus, in one form the dimples have been removed from the infrared bulb of the present belt welding apparatus so that an inner surface of the inner tube remains has a smooth generally uninterrupted surface along its longitudinal length. In this manner an even radiation pattern can be applied to the edges 85 and 90 of the belt ends 35 and 40, without an interference therealong. The infrared heater quickly heats up, almost instantaneously to decrease cycle time.

The heating device 70 may also include vertical guiderails 185 that are positioned at each longitudinal end of the heating device 70 and received in the corresponding vertical channels 205 formed in the inner surfaces 175 of the end plates 155 and 160, as described above. The vertical channels 205 facilitate movement of the heating device 70 vertically up and down between the lower stowed position and the raised heating position of the heating device 70 as described above. However, the configuration of the vertical guiderails 185 within the vertical channels 205 restricts the heating device 70 from moving in directions other than vertically up and down, so that when the heating device 70 is raised to the heating position, the heater 75 will be configured at substantially equal distances from both of the belt ends 85 and 90.

With the lever 95 moved to the belt heating operation position 23 so that both the heating device 70 and the platen 10 are in a heating position, the heater 75 can be activated to provide thermal radiation to heat edges 85 and 90 of the belt ends. In one example, the heater 75 is preferably in the form of an elongate infrared heater that heats to provide infrared radiation to the belt ends 35 and 40. During heating of the belt ends 35 and 40, the infrared heater 75 generates thermal radiation for a predetermined amount of time, until the belt ends 35 and 40 are sufficiently softened for the welding operation. The predetermined time is determined based on specific characteristics of the belt ends 35 and 40 and the distance between the belt ends and the infrared heater 75 when both are in the heating positions and the rating of the heater 75. To this end a timer device 367 is provided for indicating after the predetermined time has elapsed. In one form, the timer mechanism is configured to turn the heating device 70 off to stop providing heat to the belt ends after the predetermined time has elapsed.

As discussed above, vertical guiderails 185 are disposed on each longitudinal end of the heating device 70 and are received by corresponding vertical channels 205 on the end plates 155 and 160. With the vertical guiderails 185 inserted in the vertical channels 205, the heating device 70 is vertically movable between a lowered stowed position and a raised heating position. In the lower stowed position, the top of the heating device 70 is preferably positioned vertically below the bottom surfaces of the platens 10 and 15, to provide clearance for the movable platen 10 to move over the heating device 70 into the loading position of the movable platen 10. When the platens are laterally spaced in their heating position the heating device 70 can be raised vertically between the platens 10 and 15, and more specifically between the belt ends 35 and 40 resting thereon, to the heating position. In the heating position, the heating device 70, and more specifically the elongate heater 75 is positioned between the edges 85 and 90 of the belt ends 35 and 40 and is generally horizontally coplanar with the belt ends 35 and 40 to provide generally even heat distribution along the entire thickness of the belt edges 85 and 90. In the heating position, elongate heater 75 is also configured so that it is spaced at a generally uniform distance away from the belt edges 85 and 90 along the entire lateral width of the belt ends 35 and 40, providing generally uniform heat distribution along the entire widths of the belt ends 35 and 40.

As mentioned previously, in one aspect, movement of a single actuator or rotatable lever 95 is configured to rotate cam discs 100 and 110 to drive the movement of both the movable platen 10 and the heating device 70. In this regard, the movement of the movable platen 10 and heating device 70 to their corresponding operation positions can be carried out sequentially by the programming of the driving mechanism so that rotation of the lever 95 through its full range moves the movable platen and the heating device 70 relative to one another into their operation positions at appropriate times during the welding operation rather than requiring an operator to separately synchronize the movement of the platens 10 and 15 and the heating device 70, which increases the difficulty in operating a welding apparatus and can potentially cause the platens and heating element to interfere with one another through their ranges of motion.

The lever 95 is rotatable along an arcuate pathway with different preset angular positions of the lever 95 along the arcuate pathway (FIG. 2) generally corresponding to different lateral positions of the movable platen 10 and/or the heating device 70. Positive stops; e.g. ends of the cam path 120, are provided for restricting movement of the lever 95 beyond two end portions of the arcuate pathway. In one aspect, the lever 95 is rotatable by 180 degrees along the arcuate pathway, wherein specific angular positions of the lever 95 along the arcuate pathway correspond to specific lateral positions of the movable platen 10 and/or specific vertical positions of the heating device 70. When the lever 95 is positioned at a predetermined intermediate angular position 21 along the arc pathway, in a belt loading operation position, the movable platen 10 is positioned at a predetermined distance away from the fixed platen 15. In one form the predetermined angular position is at about 15 degrees from the belt joining operation position location, which herein is referred to as the 0 degree location, and the fixed distance is about 8 mm. In the furthest rotary direction at one end of its movement along the arcuate pathway the lever is in the belt heating operation position 23 and the platens are spaced apart and the heater is in a raised heating position with the belt ends positioned a predetermined distance away from the heater. In one form, this is in the 180 degree position. When the lever 95 is moved in the opposite rotary direction, past the intermediate location, and to the furthest angular position it is in the belt joining operation position 20 and the drive mechanism 210 slides the movable platen 10 laterally toward the stationary platen 15 in their closest position corresponding to the welding position of the movable platen 10. In the joining position the belt ends 35 and 40 supported on the platens 10 and 15 are moved beyond their initial loading position toward each other by a predetermined distance to clash and overlap the melted belt ends together. In one form, the belt joining operation position of the actuator corresponds to the 0 degree position and the platens are spaced from each other by about 7 mm. While the belt ends can be positioned on the platens in their loading position so that the belt edge portions 85 and 90 are spaced from one another, preferably the belt ends abut end-to-end in the loading position. In this manner, when the belt ends are moved to the belt joining position 20, the platens have moved from 8 mm apart to about 7 mm apart to produce about 1 mm of belt overlap or clash.

An additional intermediate predetermined rotational position of the lever 95 corresponds to a transition portion of the driving mechanism 210, wherein the movable platen 10 reaches its furthest lateral position away from the stationary platen 15, at which point the drive mechanism stops movement of the platen 10. In one form, this corresponds to the 90 degree position of the lever 95. At this position, the platens 10 and 15 define a gap 80 that provides sufficient clearance for the heating device 70 to move vertically upward between the belt ends 35 and 40 positioned on the platen upper surfaces 60 and 65. Also at the transition position, the heating device 70 begins to move vertically upward from the stowed position within the heating device housing 165 toward the heating position. Finally, at the opposite extent of the rotation of the lever 95, the heating device 70 reaches its highest vertical position so that the elongate heater 75 is positioned between the belt edges 85 and 90 as described above.

Turning to more of the details, in one example, when viewing the front face 290 of the rotatable disc 100, the lever 95 is configured to rotate by 180 degrees in a clockwise direction between a 0° position 20 corresponding to the lever 95 extending substantially horizontally to the left and a 180° position 23 corresponding to the lever being rotated 180 degrees in the clockwise direction from the 0° position so that the lever 95 extends substantially to the right. At this point, it should be noted that the cam discs 100 and 110 have substantially mirror image cam cutouts 120 of one another, such that the movement of the cam discs causes substantially the same movements of the corresponding cam followers and the movable platen 10 and heating device 70, to ensure that the platen 10 and heating device 70 are driven uniformly from each longitudinal end. The belt loading intermediate operation position 21 of the lever 95 is at about 15 degrees. Finally, the transition intermediate position of the lever 95 is at about the 90 degree position 22. With this in mind, reference made herein to movement of cam followers within the cam cutouts 120 refers generally to the uniform movement in each of the cam discs 100 and 110.

At the 0° position, the belt welding apparatus 5 is in the welding configuration and the movable platen cam followers 125 engage the first ends 295 of the cam cutouts 120, which act as positive stops, restricting counter-clockwise rotation of the lever 95. This position represents the closest lateral position of the platens 10 and 15 relative to one another, corresponding to the welding position, and the heating device 70 is in the lowered stowed position. With the lever 95 rotated to the opposite end of its range of motion to 180° position, the heating device cam followers 130 engage the second ends 300 of the cam cutouts 120, which act as positive stops, restricting further clockwise rotation of the lever arm 95 and rotatable discs 100 and 110. In this position, the movable platen 10 is positioned at its furthest lateral distance from the stationary platen 15 and the heating device 70 is raised to the heating position.

The cam cutouts are generally u-shaped channels in the discs 100 with a shared constant radius portion 340 and changing radius portions 305 and 345. In this example, angular rotation of the lever 95, clockwise and counterclockwise, between the 0° and 180° positions, generally corresponds to movement of one or both of the movable platen 10 and the heating device 70 relative to the belt welding apparatus 5. Clockwise rotation of the lever 95 from the 0° position initially causes the cam surfaces 135 in the cam cutouts 120, and specifically an increasing radius platen active portion 305 thereof to urge the movable platen cam followers 125 radially outward along the disc radius from its center of rotation, which causes the cam followers 125 to urge the movable platen 10 laterally away from the stationary platen 15. Specifically, in this example, rotation of the lever 95 by about 15 degrees to the intermediate position 21, corresponding to the loading position of the lever 90, moves the movable platen 10 away from the stationary platen 15 by a predetermined distance that corresponds to the loading position of the movable platen 10. The predetermined distance is determined as the distance that the platen 10 should move toward stationary platen, beyond their loading position to the welding position so that the belts ends 35 and 40 are forced against one another by a sufficient amount to allow the material of the softened belt 35 and 40 after heating to intermix causing the belt ends 35 and 40 to become fused together upon their subsequent cooling. In one example, this distance is approximately 1 mm. On the other hand, the heating device 70 remains stationary during this portion of the rotation of the lever 95 because the heating device cam follower 130 is within an inactive portion 340 of the cam cutouts 120.

A detent or position lock 310 may be provided to aid the operator in determining the proper rotation position of the lever 95 into the loading position of the movable platen 10 and also to maintain the movable platen 10 in the loading position as the belts are positioned on the platen upper surfaces 25 and 30. The position lock 310 includes a detent mechanism or a spring loaded pin 315 that mates with an aperture 320 on an inner surface of the rotatable cam disc 100 when the disc is rotated to the loading position. When the position lock is operative and the disc 100 is rotated to the loading position, the lock aperture 320 on the disc inner surface 325 is positioned adjacent to the pin 315 so that the spring loaded pin 315 is urged under the force of the spring into insertion in the lock aperture 320, restricting rotation of the rotatable cam disc 100 from the loading position. In this position, the belt ends 35 and 40 can be loaded on the platen upper surfaces 25 and 30 as described previously. To rotate the rotatable disc 100 from the locked loading position, a handle 335 of the position lock 310 may be grasped by the user and pulled away from the disc 100 against the force of the spring and out of its mating engagement with the lock aperture 320, allowing the rotatable disc 100 to be rotated.

Another transition operation position 22 of the lever 95, in this example about 90 degrees, corresponds to the transition portion wherein the movable platen cam follower 125 is positioned at the radial outermost extent of its path in the cam cutout 120 (not shown). At this position, the movable platen 10 is positioned in the heating position, at its furthest lateral position away from the stationary platen 15. Thus, because this rotation corresponds to the movable platen cam follower 125 being positioned in an inactive portion 340 of the cam cutout 120, further clockwise rotation of the lever 95 will riot cause additional lateral movement of the movable platen 10. However, at the transition position, the heating device cam followers 130 will enter the decreasing radial portion of the cam cutouts 120 so that further clockwise rotation will cause the cam surfaces 135 in the cam cutouts 120 to urge the heating device cam followers 130 radially inward along the rotatable disc 100, causing the heating device 70 to move vertically upward from the stowed position to the heating position in the gap 80 now defined between the laterally spaced platens 10 and 15. Thus, in the transition position 22, both the cam followers 125 and 130 are in the constant radius portion. A cam cutout second end portion 300 restricts rotation of the rotatable disc 100 beyond the 180 degree position.

When the lever 95 is rotated by a predetermined amount in the counterclockwise rotation direction back to the 0° position from the 180° degree heating position, the cam surfaces 135 in the cam cutouts 120 act in reverse of that described above so that the heating device cam followers 130 are urged along the heater active portion 345 radially outward from the disc center of rotation, which urges the heating device 70 to correspondingly move vertically downward from its raised heating position until it reaches its lowered stowed position at about the 90° degree position of the lever 95. As with the movable platen cam follower 125 described previously, when the heating device cam follower 130 reaches the constant radius inactive portion 340, further counterclockwise rotation of the lever 95 does not cause further radial movement of the heating device cam follower 130 and thus the heating device 70 remains in its lowered stowed position. However, movement beyond the 90° transition position in the counterclockwise direction causes the movable platen cam follower 125 to enter the platen active portion 305 of the cam cutout 120 so that the movable platen cam follower 125 is urged radially inwardly along the platen active portion 305 correspondingly sliding the movable platen 10 toward the stationary platen 15, past the loading position, until it reaches the welding position, which corresponds to the 0° position of the lever 95. As mentioned previously, in the welding position, the platens are positioned closer together than in the loading position so that the belts that were loaded in end-to-end abutment are clashed together to overlap by the predetermined distance between the loading and welding positions causing the melted material at the edges 85 and 90 of the belt ends 35 and 40 to intermix. At this point, a portion of the melted material will be extruded outwardly from the belt edges, forming a mushroom of material surrounding the weld location. The belt ends are maintained in the welding position where they are allowed to cool, which will cause the material of the two belt ends 35 and 40 to fuse, joining the belt ends 35 and 40 together.

In one aspect, when the belt welding apparatus 5 is being used to form a weld between the ends of one or more positive drive belts 265 prior to performing the welding operation, the belt ends 35 and 40 may be prepared by cutting the belt ends to maintain the pitch between the two ribs positioned on either side of the weld site after welding. In this regard, the welded belt will not have a pitch between ribs at the welding site that is different than the pitch for the remainder of the belt. In one example, to maintain the pitch between the ribs at the welding site, the belt ends should be prepared so that each belt end has a distance between the edge 85 and 90 of the belt end 35 and 40 and the adjacent rib that is equal to one half the pitch of the positive drive belt plus one half of the predetermined distance the belt ends are clashed together beyond their in end-to-end abutment loading position. This generates a desired amount of clash or overlap with the excess belt material so that the belt material intermixes and a portion of the material is extruded out from between the belts. In this regard, upon welding of the belts, when the belts are pushed together by the predetermined distance, the length of each belt end should be decreased by one half of the predetermined distance as belt ends are pushed together. Accordingly, the original pitch between the ribs will be obtained.

To form a uniform pitch a template may be provided for preparing the belt ends so that with the platens positioned in the belt joining position the belt ends have undergone the desired amount of clash and in the belt heating position the belt ends are spaced by a predetermined distance from the heating device. In this regard, the template provides an indication to the operator for where the belt end should be cut relative to an outermost belt drive rib 425 and 430 so that proper heating distance and clash will be achieved. Cutting the both of the belt ends at the proper distance from the outermost drive rib 425 and 430 is also important because it maintains the pitch of the conveyor belt between the drive ribs even at the location of belt welding. In one form, the template 400 includes an elongate body member 405 formed of a strong material that will preferably retain its shape to provide accurate cuts. The template has an elongate cutting edge 410 along one edge thereof. In one form, the template is used to provide square cuts laterally across each of the belt ends along the belt material at a predetermined distance from the closest adjacent drive rib 425 and 430. It should be noted that the template may be configured for more than one belt. For example, the template maybe configured to provide cuts for conveyor belts with a pitch of about 26 mm and a pitch of about 50 mm. The first groove 415 is used for the 26 mm pitch conveyor belts while the second groove 420 is used for the 50 mm pitch belts. In this manner, the outermost drive rib of the 26 mm and 50 mm belts should be positioned in the corresponding grooves 415 and 420. The predetermined distance is about half of the pitch of the positive drive belt being joined plus about half of the overlap or clash that the belt welding apparatus 5 is configured to provide between the belt ends, i.e., the extent that the belt ends are overlapped during welding beyond end-to-end abutment. In one example, when a positive drive belt having a pitch of about 26 mm is being used, the template is configured to aid in forming lateral cuts across each of the belt ends at approximately 13.5 mm and the lateral distance between the belt loading position and the belt joining position is about 1 mm so that about 1 mm of belt overlap is created during welding. In this manner, when the belt ends are welded so that they overlap by about 1 mm, each belt end 35 and 40 is reduced in length by about 0.5 mm so that the ribs 425 and 430 adjacent to the belt edge portions 81 and the corresponding formed weld 2 respectively will have a pitch of about 26 mm, or the uniform pitch of the positive drive belt, upon being welded together.

The cutting edge preferably includes a substantially straight edge that is parallel to the groove 415 or 420 so that a straight cut is made orthogonally across the lateral width of the belt to ensure that belt ends 35 and 40 prepared on the template, when joined, will be properly oriented to each other with their lateral edges extending in a generally longitudinal straight line in the lengthwise direction. To use the cutting template 400 a user can place the belt end on a cutting surface with the drive ribs extending upwardly. The cutting template is positioned laterally across the belt with the guide groove 415 or 420 positioned over the drive rib 425 or 430 adjacent to the desired cut location. With the template 400 in position, the user can either mark the belt at the desired cut location for subsequently making a cut along the mark or can cut the belt with the template in place by moving a cutting tool along the cutting surface to cut the belt end there along.

In addition, when a belt welding apparatus 5 is used to weld together the ends of one or more positive drive belts 265, the recesses 255 may be configured to accommodate belts prepared in the above described manner by forming the recesses 255 of each of the platens 10 and 15 that are closest to the gap formed between the platens 10 and 15 to allow the belts prepared as described above to be positioned end-to-end when the platens in the loading position and the ribs are inserted in the recesses 255.

To facilitate calibrating the platens 10 and 15 to be properly spaced, one of the platens is a calibrating platen can be released from a secure connection with the drive mechanism, to become laterally slidable by a small amount relative to the other platen and the drive mechanism 10. In this manner, a user can calibrate the positioning of the platens, by first rotating the lever 95 to the welding position. With the drive mechanism 210 in the welding position, a continuous positive drive belt with the pitch equal to the pitch of the belts that will be used with the welding apparatus 5 is positioned with its ribs inserted into the recesses of the non-calibrating platen. The calibrating platen can then be slid until the ribs 260 over the calibrating platen align with the recesses 255 in the calibrating platen surface. The calibrating platen can then be secured back to the drive mechanism 210. In this manner, when a weld is formed, the pitch between the ribs adjacent to the welding site should be equal to the pitch in the remainder of the positive drive belt. Additionally, with the platens 10 and 15 calibrated, a user can quickly determine if the ends of a positive drive belt or belts to be welded together were properly prepared by positioning the belt ends 35 and 40 with the ribs 260 in the recesses with the lever 95 in the loading position. In this manner, if the belt ends 35 and 40 were properly prepared, the edges 85 and 90 of the belt ends 35 and 40 should abut end-to-end in this configuration.

It should be noted that while the movement of the lever 95 has been described herein to refer to particular operative positions of the lever 95 and the movable platen 10 and heating device 70, it should be understood that the lever 95 provides generally continuous movement between and through the operative positions with the exception of the position lock 310 maintaining the lever arm 95 in the loading position during loading of the belt ends 35 and 40 on the platens 10 and 15.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A welding apparatus for joining monolithic belt ends, the welding apparatus comprising:
   a frame;
   a pair of elongate platens mounted to the frame to be movable laterally relative to each other in a belt shifting direction and each having structure for receiving projections of the belt ends to be configured to support the belt ends and to resist lateral movement of the belt ends thereon;
   a non-contact heating device having an elongate, infrared heating filament for generating thermal radiation and being mounted to the frame to be movable vertically in a heating device shifting direction between a lowered, stowed position generally below the platens and a raised, heating position to be disposed between and spaced from the belt ends; and
   a user-operable actuator including a rotatable lever operatively coupled to at least one of the platens and the non-contact heating device so that the same lever is rotatable by a user to at least three different preset operation positions along an arcuate pathway to laterally move the platens relative to each other in the belt shifting direction with the belt ends supported thereon and to vertically move the heating device in the heating device shifting direction so that the platens and the heating device shift relative to each other as the lever is rotated along the arcuate pathway to the at least three different preset operation positions thereof.

2. The welding apparatus of claim 1, wherein the at least one platen has a movable mount connected thereto, and the non-contact heating device has a movable mount connected thereto, and
   the lever is rotatable to sequentially shift the movable mount for the one platen in the belt shifting direction and the movable mount of the non-contact heating device in the heating device shifting direction that is orthogonal to the belt shifting direction.

3. The welding apparatus of claim 1, wherein the lever is configured to be rotatable to shift the at least one platen and the non-contact heating device between a belt loading position, the belt end melting position, and a belt end joining position relative to each other.

4. The welding apparatus of claim 3, wherein the platens are configured to support the belt ends to be closely adjacent to or in engagement with each other and the non-contact heating device is configured to be disposed in a stowed location when the at least one platen and the non-contact heating device are shifted to the belt loading position by rotation of the lever.

5. The welding apparatus of claim 3, wherein the platens are configured to support the belt ends to engage each other and the non-contact heating device is configured to be disposed in a stowed location when the at least one platen and the non-contact heating device are shifted to the belt joining position by rotation of the lever.

6. The welding apparatus of claim 1, wherein the non-contact heating device comprises an infrared heating device having an elongate tubular bulb including an elongate chamber, the elongate filament extending in the elongate chamber, and a coating extending about the tubular bulb so as to leave uncoated side portions of the bulb in lateral alignment with the filament for restricting infrared radiation from exiting through the coated portions so that infrared radiation is generally directed out from the uncoated side portions of the bulb toward the belt ends.

7. The welding apparatus of claim 6, wherein the elongate tubular bulb has a substantially smooth generally cylindrical inner surface that extends continuously without interruption along the full length of the elongate chamber.

8. The welding apparatus of claim 1, wherein the non-contact heating device comprises an infrared heating device including an elongate bulb having a predetermined length for extending the full width of the belt ends, upper and lower portions of the elongate bulb, an infrared filament extending in the upper portion of the elongate bulb, and a bulb support that extends for substantially the predetermined length of the bulb along and about the lower portion thereof to protect the elongate bulb from damage during transport.

9. The welding apparatus of claim 1, wherein the non-contact heating device comprises an infrared heating device including an elongate bulb and a bulb support in engagement therewith, the elongate bulb is of a predetermined material having a coefficient of thermal expansion, and the bulb support is of a predetermined material different from the bulb material and has a coefficient of thermal expansion that is slightly greater than the coefficient of thermal expansion of the bulb material to minimize stress on the elongate bulb from the bulb support during infrared heating operations with the infrared heating device.

10. The welding apparatus of claim 9, wherein the elongate bulb predetermined material has a coefficient of thermal expansion of about $0.59 \times 10\text{-}6/^\circ$ C. and the bulb support predetermined material has a coefficient of thermal expansion of about $1.2 \times 10\text{-}6/^\circ$ C.

11. A welding apparatus for joining monolithic belt ends, the welding apparatus comprising:
 a belt support configured to support the belt ends in spaced relation to each other;
 a non-contact heating device for being disposed between and spaced from the belt ends and for generating thermal radiation for welding the belt ends together, wherein the belt support includes a pair of platens having structures thereof for receiving projections of the belt ends, and
 a template configured for forming cut belt ends such that with the projections thereof received by the platen structures, there is a predetermined spacing between each of the belt ends and the non-contact heating device therebetween.

12. The welding apparatus of claim 1 wherein the different preset operation positions of the lever include a belt loading operation position with the platens having a first lateral spacing therebetween and the heating device in the lowered, stowed position, a belt heating operation position with the platens having a second lateral spacing therebetween that is greater than the first lateral spacing and the heating device in the raised, heating position, and a belt joining operation position with the platens having a third lateral spacing therebetween that is less than the first lateral spacing and the heating device in the lowered, stowed position, such that rotation of the lever along the arcuate pathway from the belt loading operation position to the belt heating operation position causes the platens to move laterally apart from one another and the heating device to move vertically upwardly, and rotation of the lever along the arcuate pathway from the belt heating operation position to the belt joining operation position causes the platens to move laterally toward each other and the heating device to move vertically downwardly.

* * * * *